United States Patent
Caplan et al.

(10) Patent No.: US 6,667,832 B2
(45) Date of Patent: Dec. 23, 2003

(54) LOUPE HINGE FOR MAGNIFICATION VIEWER

(75) Inventors: Charles H. Caplan, Tucson, AZ (US); Charles E. Bain, Carpentersville, IL (US)

(73) Assignee: Kerr Corporation, Orange, CA (US)

( * ) Notice: Subject to any disclaimer, the term of this patent is extended or adjusted under 35 U.S.C. 154(b) by 0 days.

(21) Appl. No.: 10/166,889

(22) Filed: Jun. 11, 2002

(65) Prior Publication Data

US 2003/0142263 A1 Jul. 31, 2003

Related U.S. Application Data

(60) Provisional application No. 60/297,719, filed on Jun. 11, 2001.

(51) Int. Cl.[7] .............................................. G02B 23/00
(52) U.S. Cl. ..................................................... 359/409
(58) Field of Search ............................ 359/409, 410, 359/411, 407, 408, 417, 418, 480, 481, 482, 382; 351/158, 41, 57; 362/26, 32, 105, 106, 804

(56) References Cited

U.S. PATENT DOCUMENTS

| | | | | |
|---|---|---|---|---|
| 1,851,579 A | 3/1932 | Hixon | ........................ | 359/411 |
| 2,456,521 A | 12/1948 | Maxwell | .................... | 359/431 |
| 3,273,456 A | 9/1966 | Feinbloom | ................. | 359/744 |
| 4,196,966 A | 4/1980 | Malis | ........................ | 350/145 |
| 4,865,438 A | 9/1989 | Wada | ........................ | 351/158 |
| 4,955,702 A | 9/1990 | Nakamura | ................. | 359/418 |
| 5,078,469 A | 1/1992 | Clark et al. | ................ | 359/481 |
| 5,196,028 A | 3/1993 | Portney et al. | ............. | 351/158 |
| 5,446,507 A | * 8/1995 | Chang | ........................ | 351/158 |
| 5,667,291 A | 9/1997 | Caplan et al. | .............. | 362/105 |
| 5,680,195 A | 10/1997 | Pekar et al. | ................ | 351/158 |
| 5,940,166 A | * 8/1999 | Miller | ........................ | 351/221 |
| 6,061,189 A | * 5/2000 | Caplan et al. | .............. | 359/744 |
| 6,064,520 A | 5/2000 | Nowak et al. | .............. | 359/411 |
| 6,201,640 B1 | 3/2001 | Caplan et al. | .............. | 359/418 |
| 6,356,400 B1 | * 3/2002 | Goff et al. | .................. | 359/802 |

* cited by examiner

Primary Examiner—Mohammad Sikder
(74) Attorney, Agent, or Firm—Wood, Herron & Evans, L.L.P.

(57) ABSTRACT

A magnification viewer includes magnification loupes, which may be attached to the bridge of a pair of spectacles by a hinge/bridge mount. A main hinge tab is pivotally connected to mount, whereby the magnification loupes may be raised and lowered from the field of vision in front of the spectacles as desired. A hinge tab saddle slidably mounted to the main hinge tab permits adjustment of the loupes along the longitudinal length of the main hinge tab to thereby adjust the distance between the lenses of the spectacles and the loupes. Loupes are suspended by pylons from a pair of loupe mount bars and are pivotally adjustable about axes through the pylons to vary the convergence angle of the pair of loupes. Mount bars are adjustable via a thumbscrew attached to the hinge tab saddle, whereby the lateral spacing of the loupes may be varied to thereby accommodate a range of interpupillary distances. Magnification viewer may further include a light mount adapter provided on hinge tab saddle for attaching a light. A pivotal attachment between light mount adapter and light permits adjustment of light to illuminate a desired area within the field of vision of magnification viewer.

7 Claims, 17 Drawing Sheets

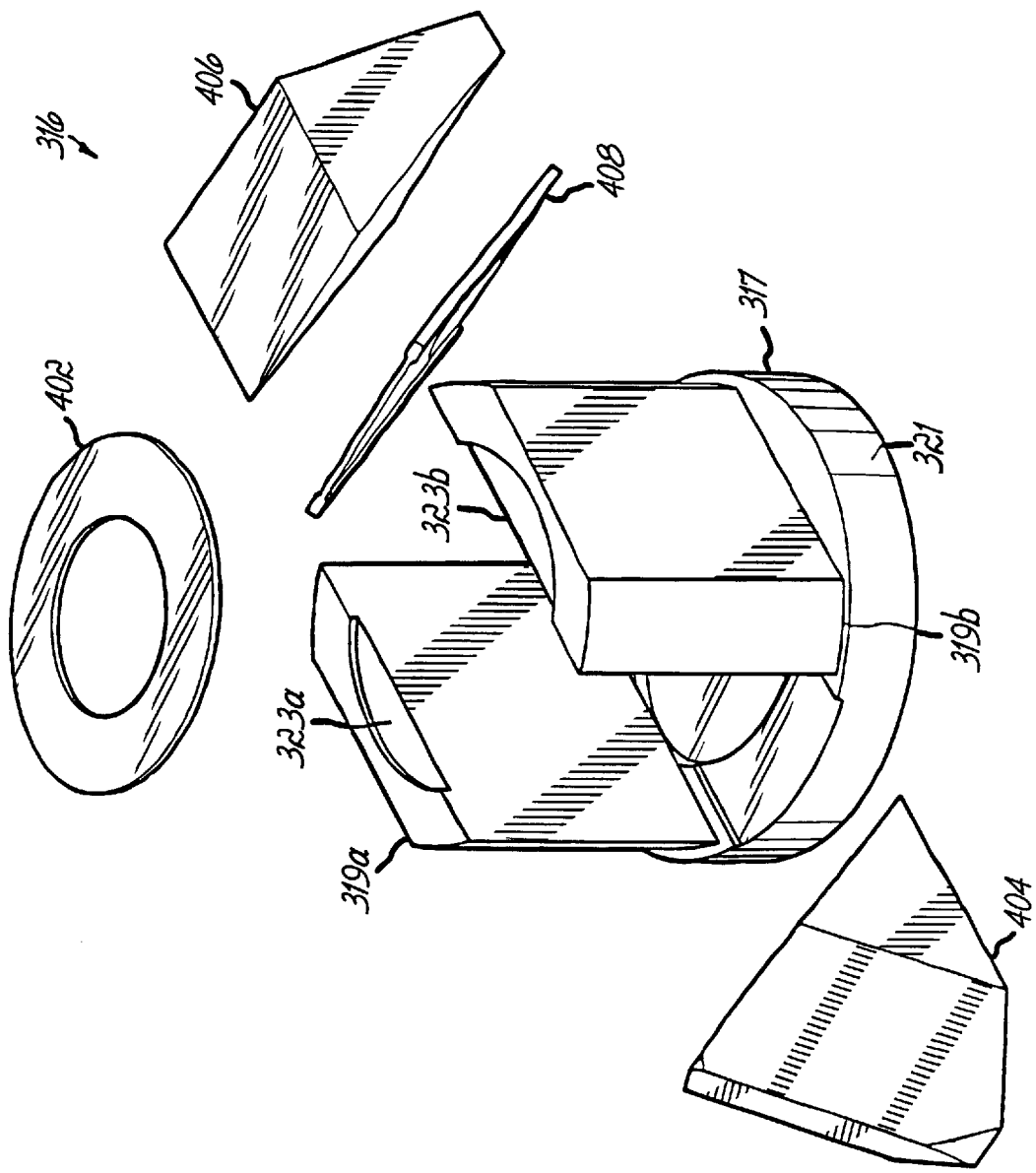

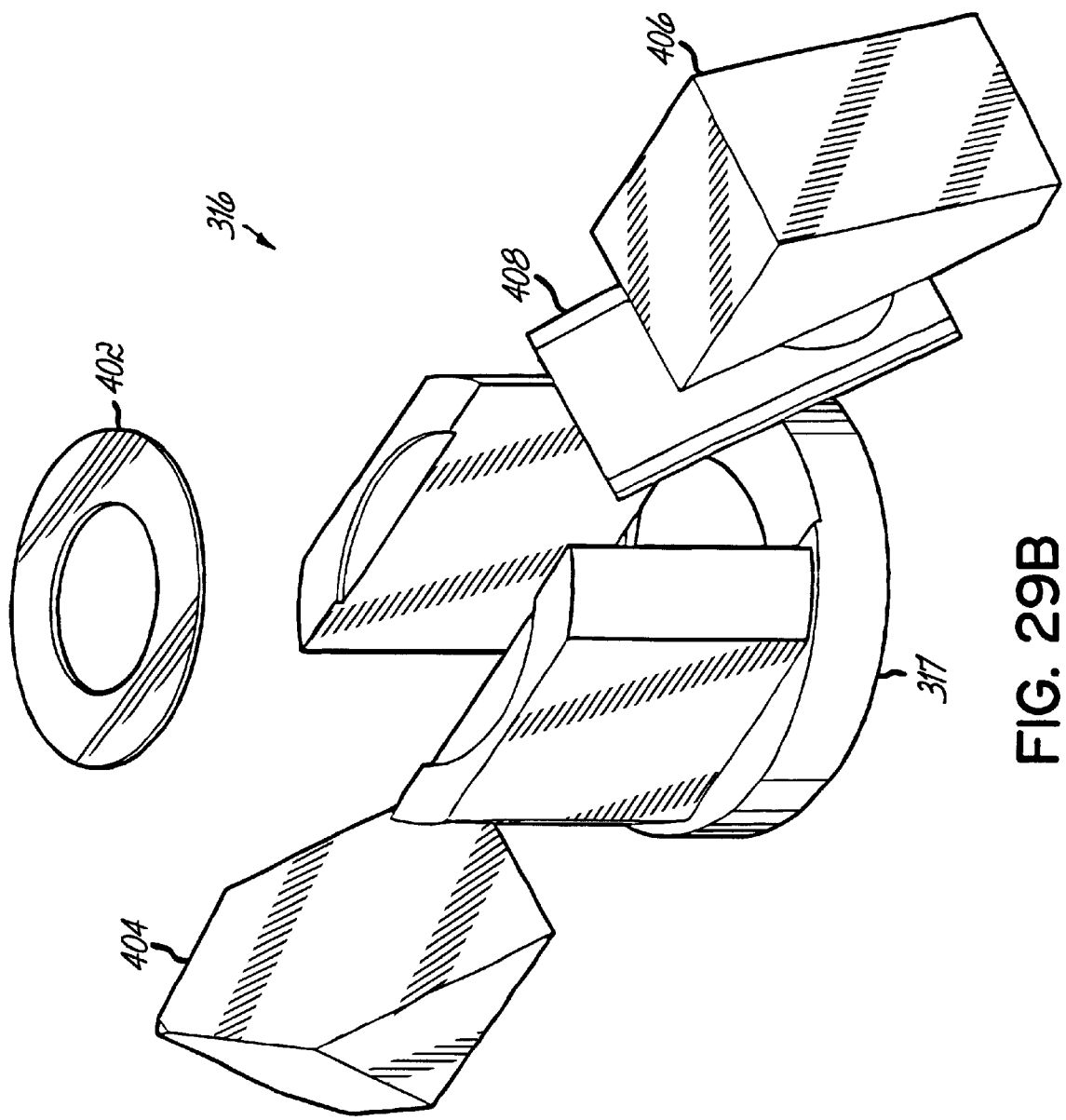

LOUPE HINGE FOR MAGNIFICATION VIEWER

CROSS REFERENCE TO RELATED APPLICATION

This application claims priority to U.S. Provisional Patent Application 60/297,719, filed Jun. 11, 2001.

FIELD OF THE INVENTION

The present invention relates generally to magnification viewers and more specifically to optical viewers worn by those who require magnification and freedom of hand movement.

BACKGROUND OF THE INVENTION

Certain work environments require that a person's head be held in a static position for long periods of time while delicate and finite tasks are performed. Some of these tasks include, but are not limited to, microsurgery, dentistry, microbiology, pathology, criminal science and fine assembly work. These tasks require that the work remain low and in front of the person. Without an apparatus that will allow a person to hold his or her head at a natural level, it is the natural tendency of the person to hunch the shoulders and/or bend over to get closer to the object being operated on. It is well known that the nature of these tasks and the physical demands they place on the neck and or the entire optical loupes. Accordingly, there is a need for a method and apparatus that allows the user to simply change the magnification, the inclination or declination, and the working distance.

SUMMARY OF THE INVENTION

The present invention presents a magnification viewer comprising magnification loupes, a plurality of adjustment members, and a mount for attaching the viewer to spectacles. This embodiment of the invention can further include a light mount for attaching a light to the magnification viewer.

Another embodiment of the present invention presents a magnification viewer that comprises at least one magnification loupe, an adjustment member, and a mount for attaching the viewer to spectacles. This embodiment of the invention can further include a light mount for attaching a light to the magnification viewer.

An additional embodiment of the present invention presents a magnification viewer that comprises a pair of magnification loupes, at least one adjustment member, and a mount for attaching the viewer to spectacles. This embodiment of the invention can further include a light mount for attaching a light to the magnification viewer.

A further embodiment of the present invention presents a magnification viewer comprising magnification loupes, a first adjustment member between the loupes such that the interpupillary distance can be adjusted, a second adjustment member for adjusting the magnification of the loupes, a third adjustment member for adjusting the declination of the loupes, a fourth adjustment member for changing the working distance of the loupes, a fifth adjustment member for changing the convergence of the loupes, a light attachment mount, and a mount for attaching the viewer to spectacles.

A still further embodiment of the present invention shows a magnification viewer that comprises a magnifying means, an adjustment means for adjusting aspects of the viewer, a light means, and a mounting means for attaching the viewer to spectacles. The adjustment means of the present invention adjusts aspects of the viewer wherein the aspects of the viewer are chosen from the following group: convergence, interpupillary width, magnification, declination, or working distance.

The present invention also encompasses a method of using the magnification viewer including the steps of: mounting the magnification viewer to spectacles, placing the spectacles on the person's face, and adjusting aspects of the viewer. Again, the aspects of the viewer that are adjusted are chosen from the following group: convergence, interpupillary width, magnification, declination, or working distance.

An alternate method of using the present invention is also described herein. This alternate method includes the steps of mounting the magnification viewer to spectacles, placing the spectacles on a person's face, adjusting the magnification of the viewer, adjusting the interpupillary width, adjusting the declination, adjusting the working distance, and adjusting the convergence.

OBJECTS OF THE INVENTION

Accordingly, it is an object of the present invention to provide a magnification viewer that is adjustable in various aspects without the need to replace portions of the viewer.

It is an additional object of the present invention to provide a magnification viewer that allows a user's head to remain in a resting posture while providing magnification to the user.

It is also an object of the present invention to provide a magnification viewer that is comfortable and easily adjusted by the user.

These and other objects, features, and advantages of the invention will become apparent from the following best mode description, the drawings and the claims.

BRIEF DESCRIPTION OF THE DRAWINGS

The Figures which follow depict a preferred embodiment of the invention, and may depict various alternative embodiments. The invention is not limited to the embodiment or embodiments depicted herein since even further various alternative embodiments will be readily apparent to those skilled in the art. For the ease of the reader, like reference numerals in various drawing Figures refer to identical structural elements or components.

FIGS. 29A and 29B are exploded perspective views of a prism assembly for the magnification loupes;

DETAILED DESCRIPTION

At the outset, it should be understood that this invention comprises a magnification viewer that can be attached to regular spectacles. The description which follows described a preferred embodiment of the invention, and various alternative embodiments. It should be readily apparent to those skilled in the art, however, that various other alternative embodiments may be accomplished without departing from the spirit or scope of the invention.

Figure 1:
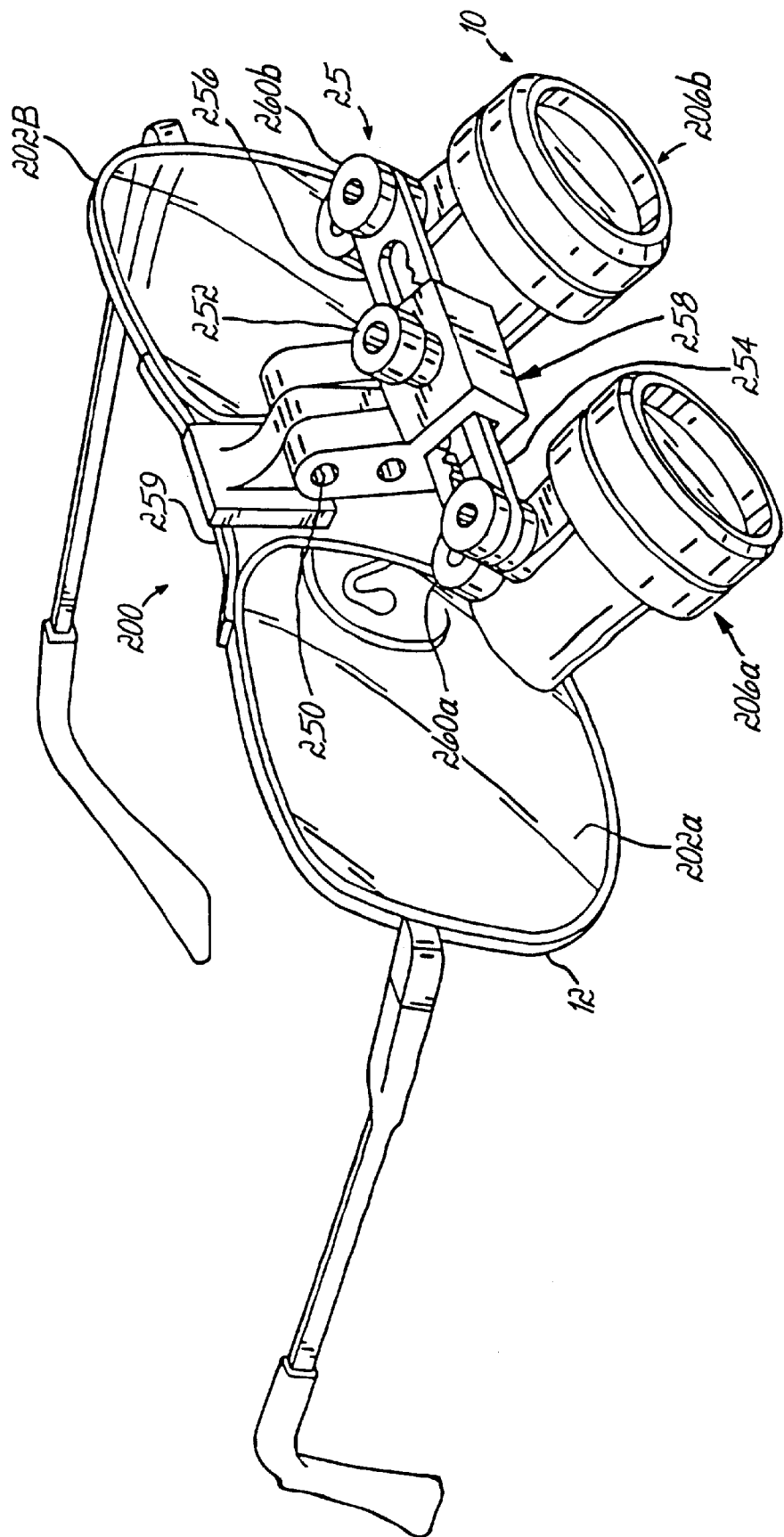
FIG. 1 is a perspective view of one embodiment of the magnification viewer according to the present invention as secured to an adjustable nose price for securing to spectacles.

FIG. 1 presents one embodiment of the magnification loupes 206a, 206b. It is noted that for the viewer systems 10 of the Figures, the optical configurations of the magnification loupes 206a, 206b and the prism and eyepiece remain the same. The viewer system 10 of FIG. 1 includes a pair of spectacles 200 including a pair of carrier lenses 202a, 202b and a binocular magnification viewer 25, including a pair of magnification loupes 206a, 206b. The binocular magnification viewer 25 may be attached to the spectacles 200 by a pivot member 250. Alternatively, the magnification loupes 206a, 206b, may be mounted close to the spectacle lenses, for example, about 0.5 mm from the carrier lenses 202a, 202b. The pivot member 250 in turn, is attached to a bridge member 258 which includes a bridge adjustment knob 252 for adjusting a pair of extension of arm 254, 256 to enable the interpupillary distances of the loupes 206a, 206b to be adjusted. The interpupillary distance of the magnification loupes 206a, 206b may further be adjusted by knobs 260a, 260b. The binocular magnification viewer 25 may be secured to the spectacles 200 by way of a clip, screws, glue or other known methods.

Figure 2:
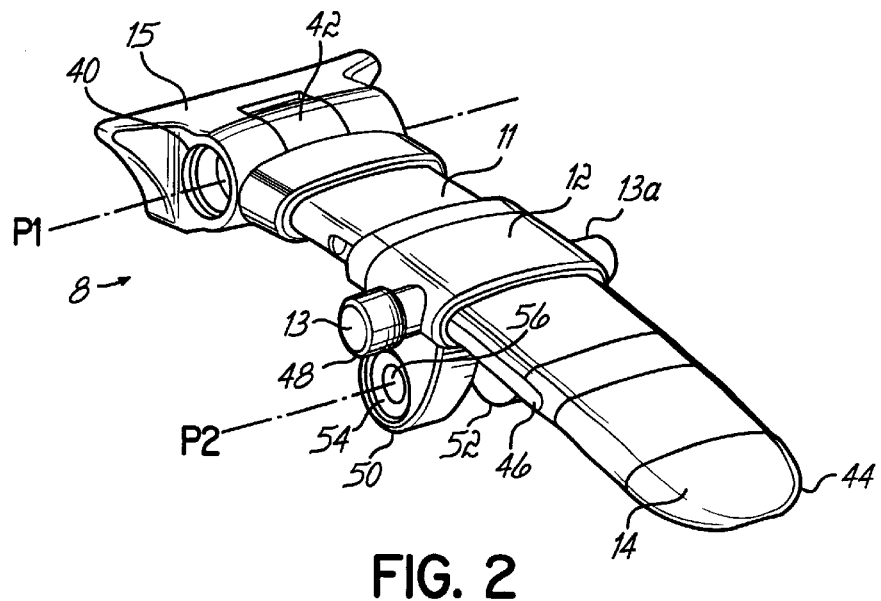
FIG. 2 is a perspective view of an embodiment of the hinge/bridge mount assembly of the present invention.
Figure 3:
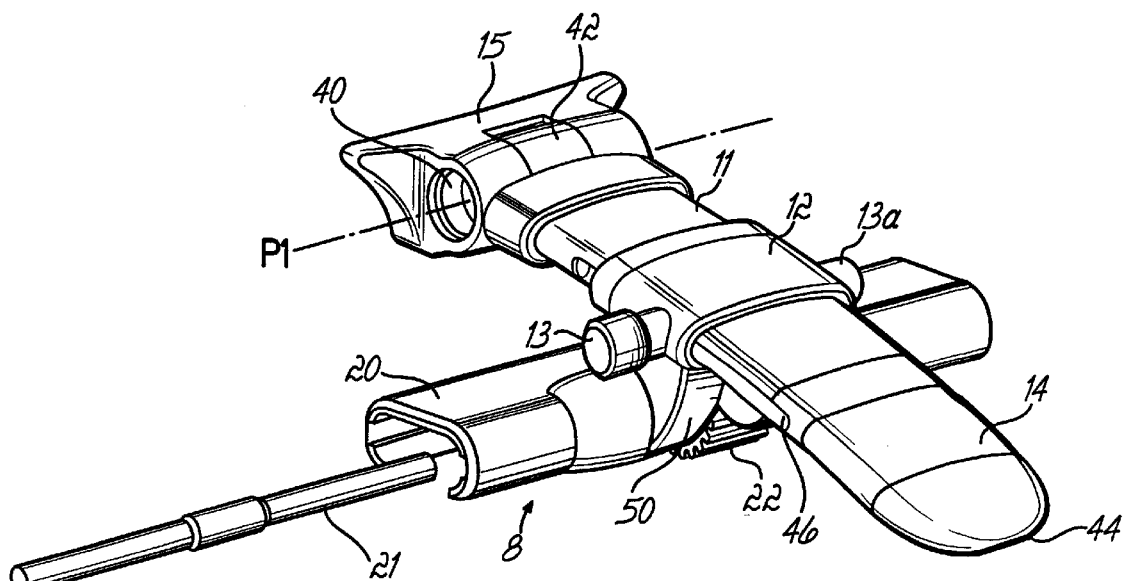
FIG. 3 is a perspective view of an embodiment of the hinge/bridge mount and the loupe mount bar of the present invention.
Figure 4:
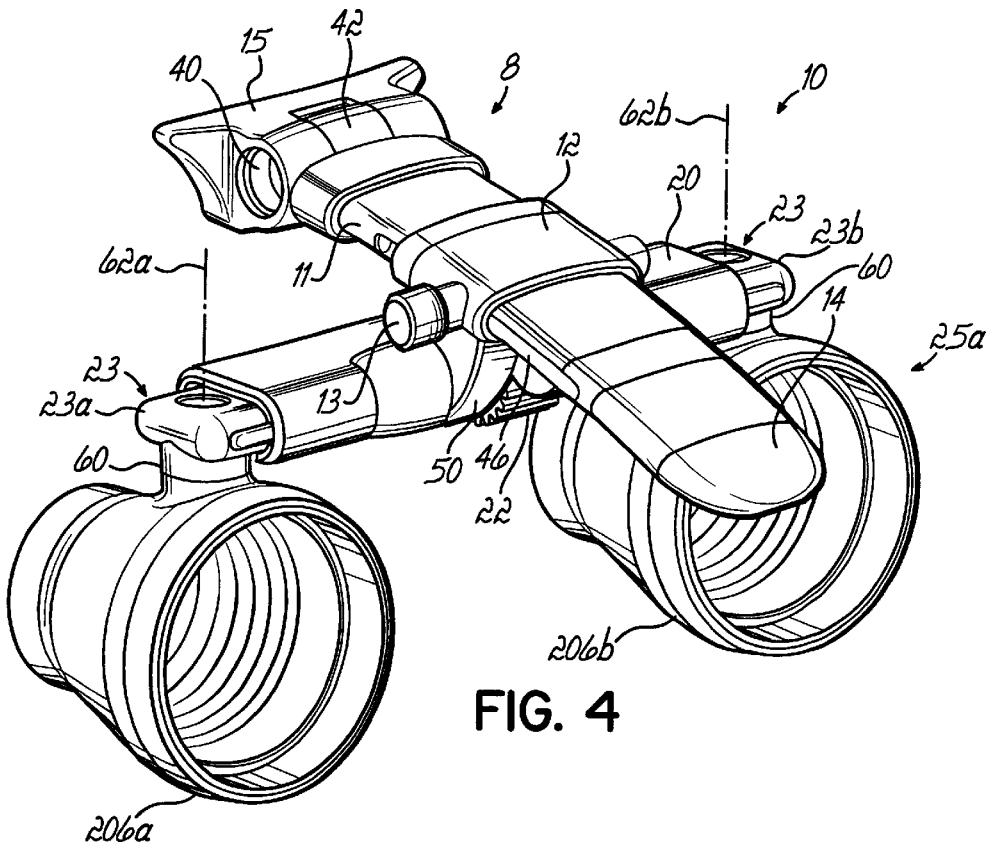
FIG. 4 is a perspective view of an embodiment of the hinge/bridge mount with the magnification loupes attached according to the present invention.

Referring to FIGS. 2–4, an alternative exemplary embodiment of a magnification viewer 25a of the present invention is shown, wherein loupes 206a, 206b are suspended from an alternative mounting apparatus 8. As shown most clearly in FIG. 2, alternative mounting apparatus 8 includes a hinge/bridge mount 15 which may be attached to the bridge 259 of spectacles 200 generally between carrier lenses 202a, 202b by known means such as clipping, gluing, soldering, or securing with fasteners. Hinge/bridge mount 15 includes at least one aperture 40 defining a first pivot access P1 for a main hinge tab 11. The main hinge tab 11 is an elongate member which may be pivotally attached at a first end 42 to the hinge/bridge mount 15, such as by a screw (not shown) inserted through aperture 40 along first pivot access P1 and secured with a nut and washer (not shown). In the exemplary embodiment shown, main hinge tab 11 has a slightly arcuate shape in a longitudinal direction from first end 42 to second end 44, and has a generally flattened oval cross-sectional shape. Main hinge tab 11 further includes generally slot-shaped recesses 46 formed into lateral side portions of hinge tab 11 and extending in the longitudinal direction intermediate the first and second ends 42, 44.

A hinge tab saddle 12 is configured to be received over the second end 44 of main hinge tab 11, such that hinge tab saddle 12 is slidably mounted onto the main hinge tab 11. Hinge tab saddle 12 includes a saddle lock screw 13 and a corresponding guide pin 13a configured to engage slot-shaped recesses 46 on main hinge tab 11. A knurled end 48 of saddle lock screw 13 permits manipulation of saddle lock screw 13 relative to the adjacent lateral side portion of main hinge tab 11 to secure hinge tab saddle 12 at a desired position along the longitudinal length of main hinge tab 11 whereby slot-shaped recesses 46 define the limits of travel of the hinge tab saddle 12 along main tab hinge 11.

A hinge grip 14 may be removably received over the second end 44 of hinge tab 11. Advantageously, hinge grip 14 provides a sterile and replaceable part which may be grasped by a user to manipulate the orientation of the magnification viewer 25a without contaminating the user's hands.

Hinge tab saddle 12 further includes first and second clevis members 50, 52 extending from a lower portion of the hinge tab saddle 12. First and second clevis members 50, 52 each have a generally circular recess 54 formed into oppositely facing sides of the clevis members 50, 52 and apertures 56 defining a second pivot access P2 parallel to first pivot access P1. An elongate loupe mount bar 20 is configured to be snap-fit over oppositely facing surfaces of the first and second clevis members 50, 52 to engage the recesses 54 on the first and second clevis members 50, 52. A cylindrically-shaped, knurled interpupillary distance ("IPD") adjustment thumbscrew 22 is inserted into the space between the first and second clevis members 50, 52 and is secured therebetween by an IPD adjustment jackscrew 21 inserted along second pivot access P2 and through the apertures 56 in the first and second clevis members 50, 52.

Loupe mount bar 20 forms a generally C-shaped channel through which ocular mount/bar extensions 23a, 23b are slidably received. Ocular mount/bar extensions 23a, 23b are coupled to IPD adjustment jackscrew 21 whereby rotation of the IPD adjustment thumbscrew 22 causes the ocular mount/bar extensions 23a, 23b to translate along a direction parallel to second pivot access P2 and thereby simultaneously extend or retract magnification loupes 206a, 206b to adjust the interpupillary distance. Advantageously, adjustment of the interpupillary distance, as described above, permits compensation for various widths between the pupils of individual users of the magnification viewer 25a.

With continued reference to FIG. 4, magnification loupes 206a, 206b are pivotally attached to distal portions of ocular mount/bar extensions 23a, 23b, respectively. In the exemplary embodiment shown, magnification loupes 206a, 206b are suspended generally beneath ocular mount/bar extensions 23a and 23b by pylons 60 which may be secured to the ocular mount/bar extensions 23a, 23b, by various means, such as by screws (not shown). Advantageously, magnification loupes 206a, 206b may be pivoted about axes 62a, 62b through pylons 60 such that the magnification loupes 206a, 206b may be adjusted approximately +/−5 degrees about the axes 62a, 62b to permit convergence adjustment, i.e., the angle at which the eyes are focused at a given distance from the pupils. Glass lens elements described more fully below are mounted inside the loupes 206a, 206b to provide the magnification required for the specified performance power of the magnification viewer.

Figure 5:
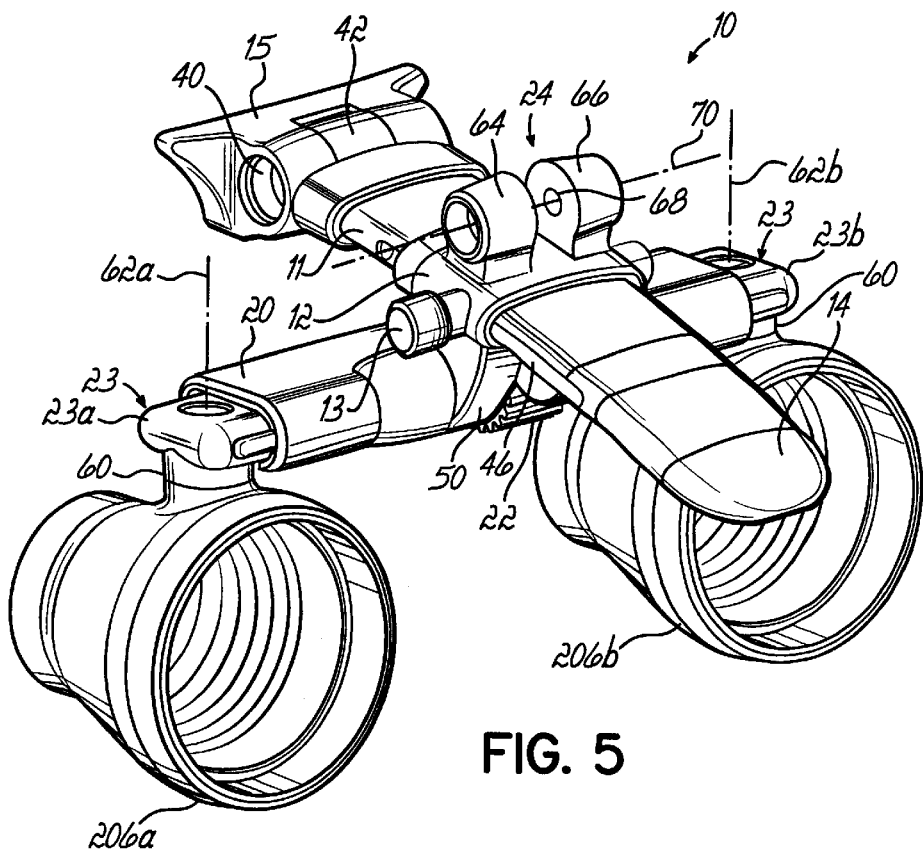
FIG. 5 is a perspective view of an embodiment of the magnification viewer of the present invention with the light mount adapter in place.
Figure 6:
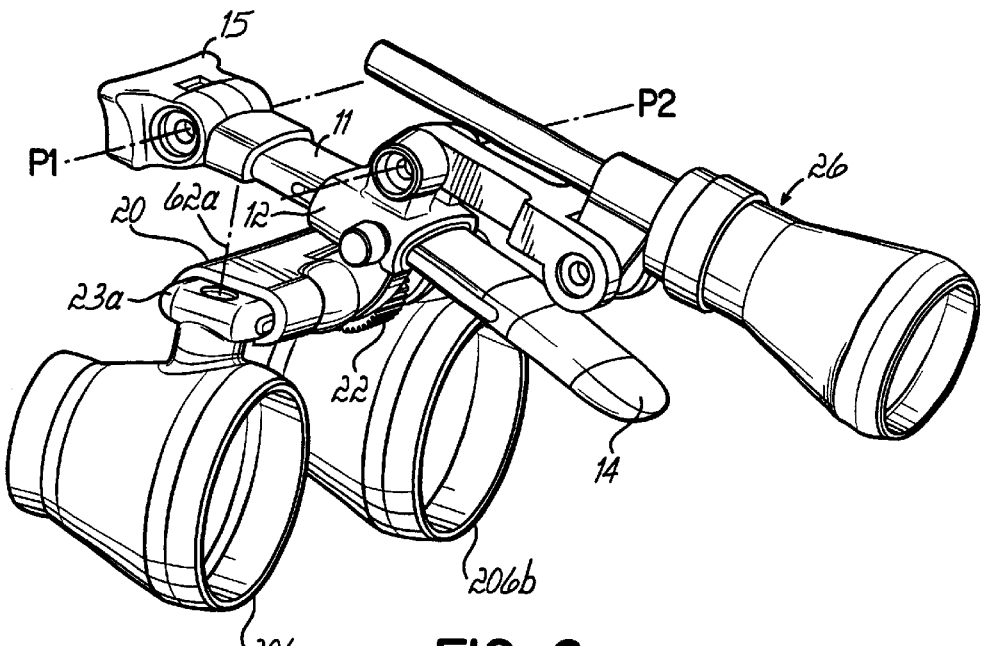
FIG. 6 is perspective view of an embodiment of the magnification viewer of the present invention showing the placement of the light.

Referring to FIGS. 5–6, a light mount adapter 24 may be provided integrally with hinge tab saddle 12, or may be configured to be snap fit directly on top of the hinge tab saddle 12. Light mount adapter 24 comprises a pair of spaced protrusions 64, 66 extending in a direction generally opposite the first and second clevis members 50, 52 of the hinge tab saddle mount 12, and is adapted to receive a work light 26 generally between the spaced protrusions 64, 66. The work light 26 may be further secured to the light mount adapter 24 such as by a fastener (not shown) installed through apertures 68 formed in the first and second protrusions 64, 66 along an axis 70 generally parallel second pivot access P2.

Advantageously, work light 26 may be pivotally adjusted about the axis 70 through first and second protrusions 64, 66 of the light mount adapter 24 to permit adjustment of a light beam provided by light 26 to thereby illuminate a desired portion of the viewing area.

Figure 7:
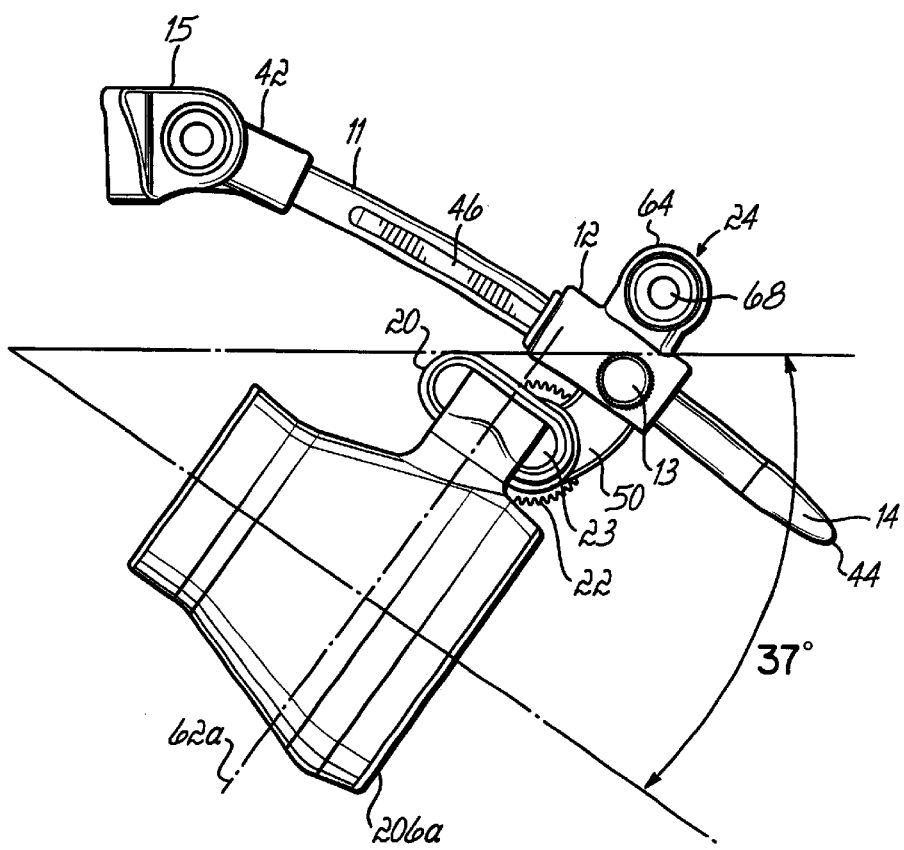
FIG. 7 is a side view of an embodiment of the present invention showing the possible range of movement of declination.
Figure 8:
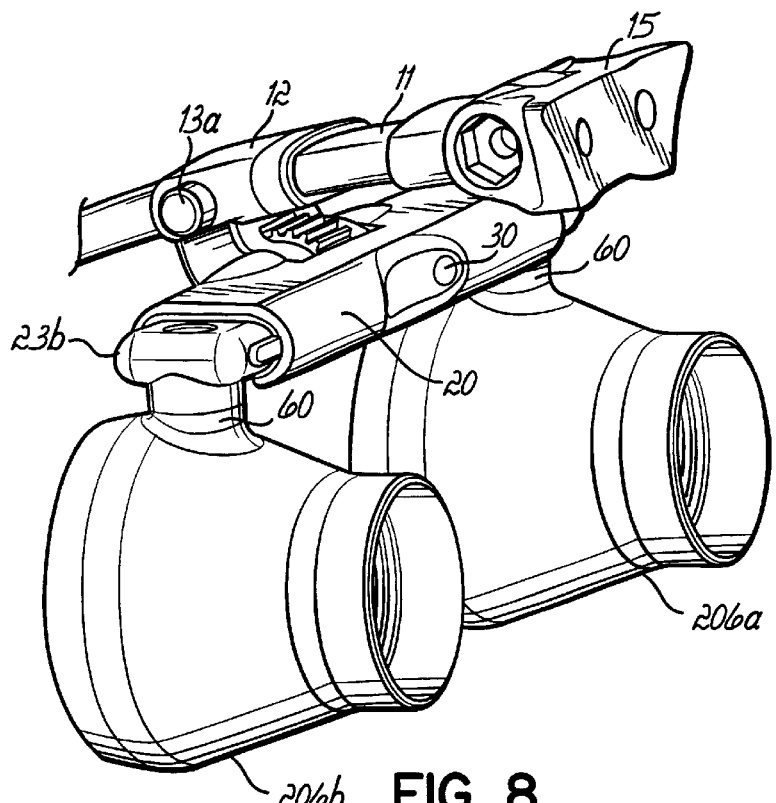
FIG. 8 is a perspective view of an embodiment of the present invention showing the placement of the declination angle lock screw.

With reference to FIGS. 7–12, use of the magnification viewer 25a will now be discussed. A user may begin by adjusting the scope low on the wearer's eyeglasses by tilting the main hinge tab 11 downward and sliding the hinge tab saddle 12 down to the end of the slot in the edge of the main hinge tab 11. Tightening the saddle lock screw 13 secures this adjustment. The ocular mount/bar 20 may then be rotated downward to a point where the wearer has a clear line of sight at the work area through the loupes 206a, 206b while keeping his head in a natural position. This is illustrated in FIG. 7. Optimum positioning will place the rear edges of the two loupes 206a, 206b coincident to the outer surface of the wearer's eyeglass lenses 202a, 202b. Fine adjustments may be made to this position by moving the hinge tab saddle 12 slightly up and down on the main hinge tab 11 until the desired field of view is obtained. These two adjustments combine to produce the declination angle of the scopes. The maximum declination angle that this scope design can achieve has been measured at 37 degrees down from horizontal as depicted in FIG. 7. This angle may be locked into position by removing the eyeglass/scope assembly and tightening a declination angle lock screw 30, shown in FIG. 8, located on the rear of the ocular mount bar 20 and further by tightening the screw (not shown) located at the hinge/bridge mount 15 and installed along first pivot axis P1. It is also required that the interpupillary width adjustment be made to obtain the optimal field of view in this position, see FIGS. 9 and 10, as well as the convergence angle adjustment. This can be accomplished by adjusting the IPD adjustment thumbscrew 22 and the angle of the loupes 206a, 206b, respectively. The loupes 206a, 206b can be tightened using convergence lock screws (not shown) located proximate the ends of both ocular mount/bar extensions 23a, 23b. The interpupillary width adjustment does not require tightening because of the mechanical advantage the IPD jackscrew 21 has over the internal threading in the ocular mount/bar extensions 23a, 23b.

In other cases the work area is higher and the need to lower the loupes 206a, 206b as low as possible is not required. It may also be that the user has the ability (or desire) to lower his head instead of the scopes. The loupes 206a, 206b would then be adjusted to a position that would have lesser declination angle. The minimum declination angle that the loupes 206a, 206b can achieve has been measured at 5 degrees down from horizontal. See, e.g., FIG. 11. This angle would be obtained by reversing the procedure described above, keeping the rear of the loupes 206a, 206b coincident to the outer surface of the eyeglass lenses, 202a, 202b and positioning the loupes 206a, 206b for the best field of view. All adjustments would be secured using the same fasteners in the same sequence as above. Of course, any settings between maximum and minimum declination angles are possible by simply adjusting to suit the requirements of the task using the method outlined above.

The IPD thumbscrew 22 represents a simple yet symmetrical and smooth movement of the loupe bar extensions 23a, 23b in and out of the loupe mount bar 20 and also prevents accidental miss-adjustment by nature of the design of the internal components. The hinge tab saddle 12 slides on the curved main hinge tab 11 gently, but calculatedly, to produce one component of declination angle as it is moved outward and is locked into place with one simple turn of the saddle lock knob 13. The combination of two axis of rotation P1, P2, one at the main hinge tab 11 and the other at the hinge tab saddle 12, produce a compound declination angle that allows for an almost infinite range of settings in this important area. The simplicity of setting the convergence angle within +5 or −5 degrees of center allows for an extremely wide range of users and an equally wide range of working distances.

The declination angle offered by this design works also as a vertical height adjustment so that the magnification viewer 25a may be adjusted for various users with differing nasal bone structures. This requires that the loupes 206a, 206b must be lowered vertically for people with high nasal bones and raised for those with low ones.

Figure 12:
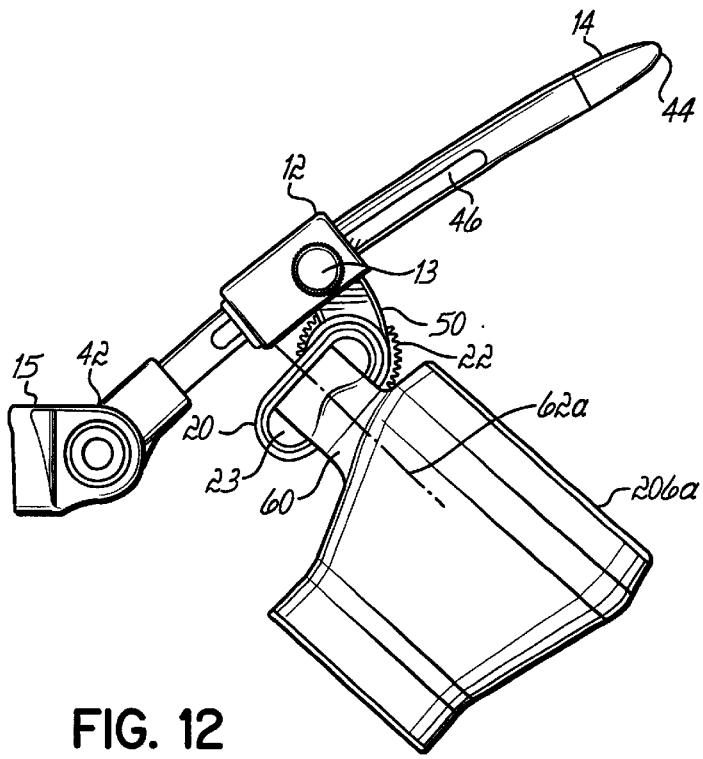
FIG. 12 is a side view of an embodiment of the present invention wherein the hinge/mount is pushed up to remove the magnification viewer from the user's line of sight.

When the loupes 206a, 206b are not needed during a procedure or when the wearer requires a clear view of his work unmagnified, they can be moved up and out of the field of view by lifting up on the hinge grip 14. This action causes the entire assembly to pivot at the hinge/bridge mount 15 and stay in place by virtue of the friction between the mating surfaces of the hinge/bridge mount 15 and the main hinge tab 11. This position is illustrated in FIG. 12.

Mechanical Characteristics

Figure 13A:
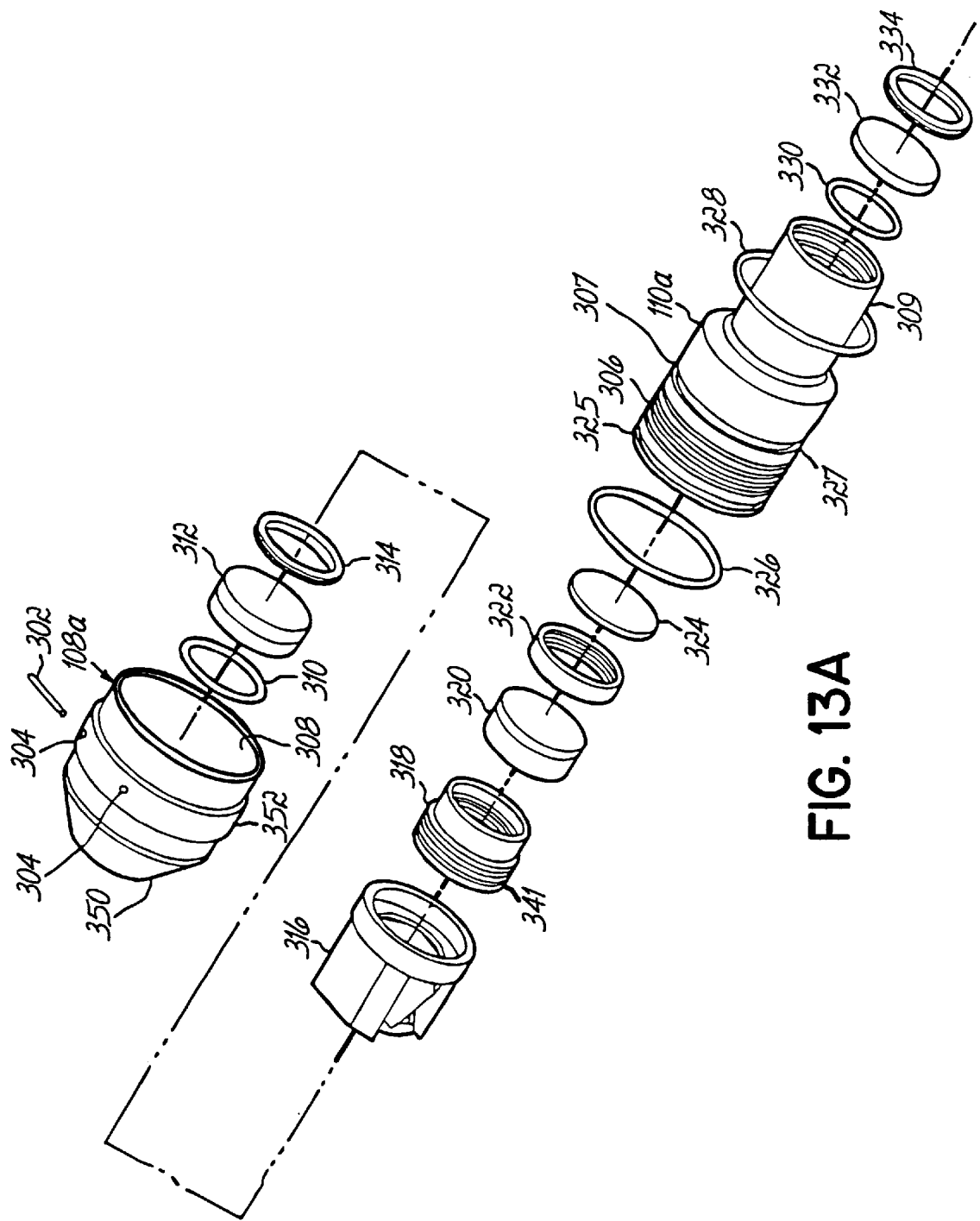
FIG. 13A is an exploded perspective view of the magnification loupe assembly for the magnification loupes of FIGS. 1 through 12.
Figure 13B:
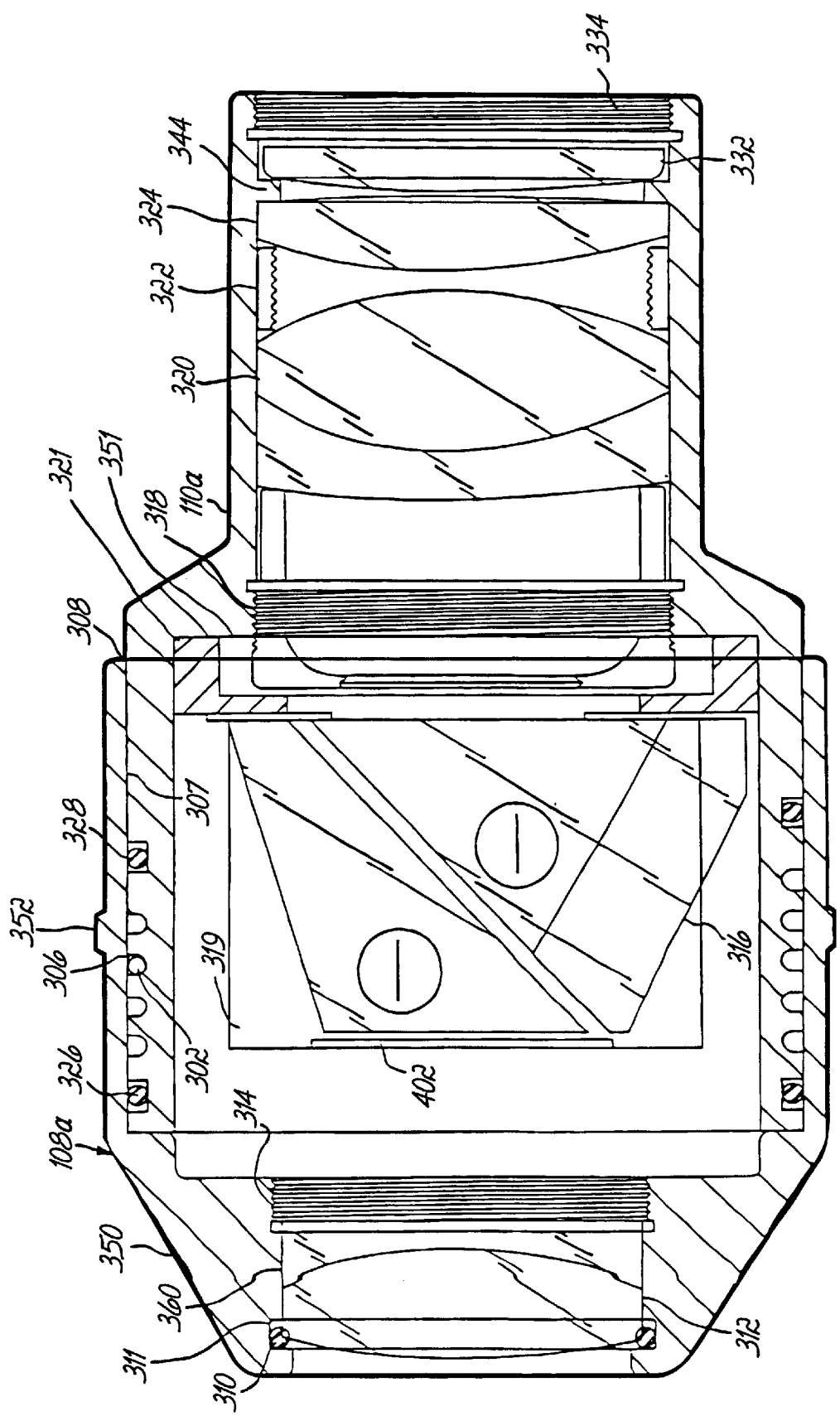
FIG. 13B is a side cross-sectional view of the magnification loupe of FIG. 13A.

Turning now to FIG. 13A, an exploded perspective view of the magnification loupes 106 in accordance with the present invention are shown. The magnification loupes 106a, 106b include a nose or objective housing 108a and a body or eyepiece housing 110a. As illustrated, the objective housing 108a includes a frusto-conical front portion 350 and a generally cylindrical rear portion 352. It is noted that the housing 108 may be of different shapes; thus, FIG. 13 is exemplary only. The objective housing 108 includes a pair of apertures 304. The apertures 304 are configured to receive a pin 302 such that the pin 302 defines a chord across the cylindrical rear portion 352 of the objective housing 108a. More particularly with reference to FIG. 13B, the objective housing 108 includes an interior surface 308 which engages an exterior surface 307 of the eyepiece housing 110. Spiral threads 306 are formed into the surface of the eyepiece housing 110. The apertures 304 are located in the objective housing 108a so that the pin 302 engage the spirals or threads 306. The pin 302 enables a threaded coupling between the two housing 106a and 108a even though only one housing 106a is formed with threads. The threaded coupling between the housings 106a and 108a permits the working distance of the loupes 108a, 108b to be adjusted by relating the objective housing 108 relative to the eyepiece housing 106a, which in turn, varies the distance between the eyepiece and objective lenses which varies the working distance of the loupes 106a, 106b.

Another important aspect of the invention, is that the configuration allows the magnification of the loupes 106a, 106b to be rather easily changed. More particularly, the pin 302 may be removably mounted relative to the objective housing 108 or fixedly mounted with the use of epoxy. Depending on the embodiment, the magnification of the loupe can be rather easily changed at the factory or by the user or both. In particular, as will be discussed in more detail below, the magnification of the loupes 206a, 206b is changed simply by changing the objective lens in the loupe 106a, 106b. The objective lenses are easily changed by removing the pin 302 which enables the objective housing 108c to be removed so that the objective lens 312 can be removed and replaced. As will be discussed in more detail below, an important aspect of the invention relates to the ability to vary the magnification of the loupe 106a, 106b.

As best illustrated in FIG. 13, the objective lens 312 is configured to rest within a first interior portion 360 of the objective housing 108a. The interior portion 360 includes a circumferential slot 311 for seating an o-ring 310 therein.

The objective lens 312 rests against the o-ring 310 and is engaged in place by a threaded retainer ring 314. The retainer ring 314 includes external threads to engage corresponding threads on the interior portion 360 of the objective housing 108.

Figure 14:
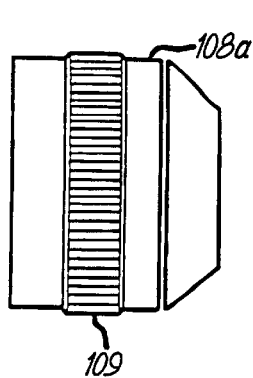
FIG. 14 is a side-elevation view of a nose housing forming a portion of the magnification viewers of FIGS. 1 and 2.
Figure 15A:
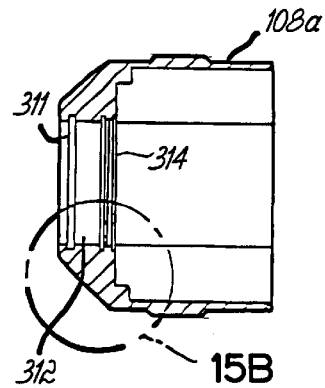
FIGS. 15A and 15B are side-cross-sectional views and detail side-cross-sectional views, respectively, of the housing of FIG. 14.
Figure 15B:
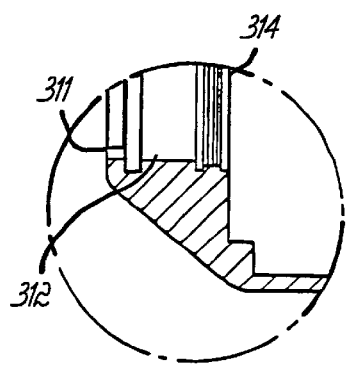
Figure 16:
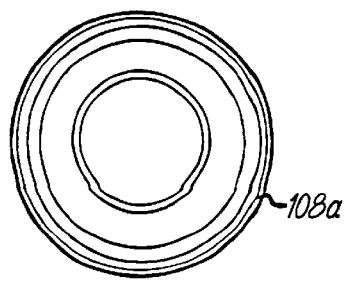
FIG. 16 is a top plan view of the nose housing of FIGS. 14 and 15.

Additional details concerning the objective housing 108 are illustrated in FIGS. 14–16. For example, the exterior of the objective housing 108 may include a knurled portion 109 for easy engagement of the objective housing 108 to the eyepiece housing 110.

Figure 17:
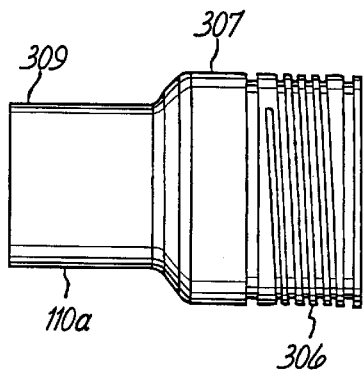
FIG. 17 is a side elevational view of the eyepiece housing of FIGS. 1 through 16.
Figure 18A:
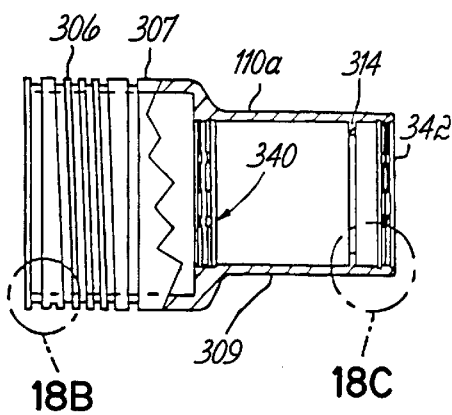
FIGS. 18A–18C are side cross-sectional views of the housing of FIG. 17, including details thereof.
Figure 18B:
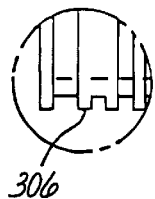
Figure 18C:
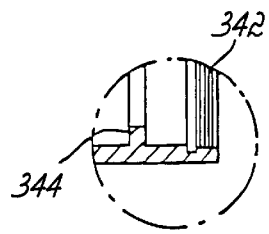
Figure 19:
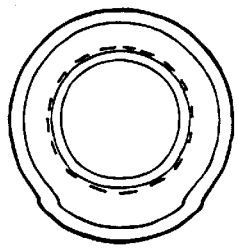
FIG. 19 is a top plan view of the eyepiece housing of FIGS. 17 and 18.
Figure 30A:
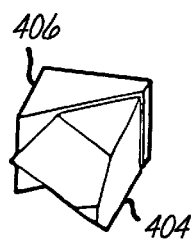
FIGS. 30A, 30B and 31–32 illustrate a prism for the prism assembly of FIGS. 29A and 29B.
Figure 30B:
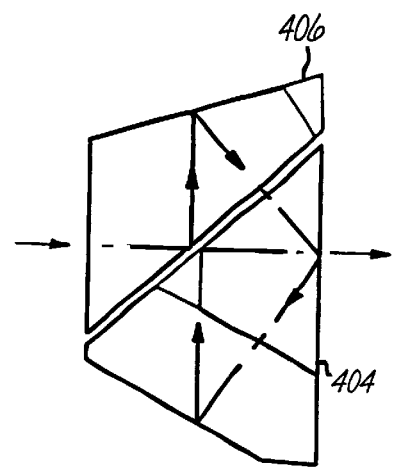
Figure 31:
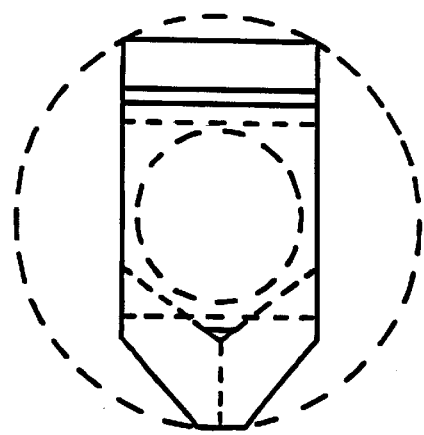
Figure 32:
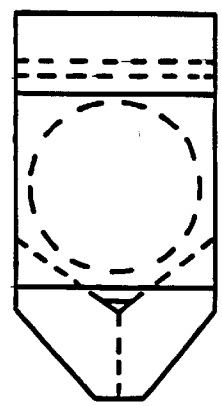
Figure 33:
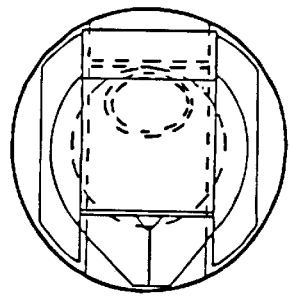
FIGS. 33–36 illustrate the prism assembly of FIG. 29.
Figure 34:
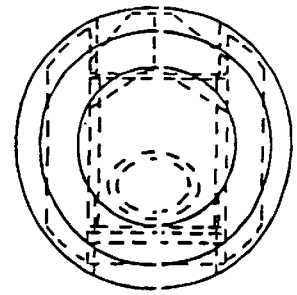
Figure 35:
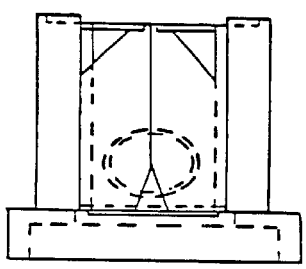
Figure 36:
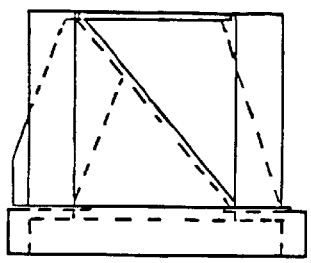
Figure 37:
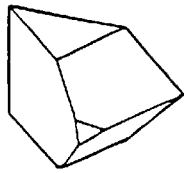
FIGS. 37–39 illustrate the roof prism of the prism assembly of FIG. 29.

The eyepiece housing 110, illustrated in greater detail in FIGS. 17–19, includes a forward engagement portion 307 and a rear cylindrical portion 309. As discussed above, the forward engagement portion 307 includes threads 306 for engagement with the pin 302. It is noted that according to one embodiment of the invention, the threads 306 are circular threads rather than notched or V-shaped threads so as to more effectively engage the pin 302. The eyepiece housing 110 includes internal threads 340 positioned where the engagement housing 307 meets the rear cylindrical portion 309. The threads 340 are configured to engage the threads 341 of the field stop 318 (FIGS. 13A, 13B). The rear cylindrical portion 309 of the eyepiece housing 110 further includes a circumferential platform 344, configured to receive a lens 332 for example, a prescription lens. The lens 332 is held in place against the platform 344 in contact with a prescription lens o-ring 340 and a retainer ring 334, which has external threads that engage the internal threads 342 of the eyepiece housing 110. In the embodiment illustrated, the rear cylindrical portion 309 of the housing 110 is configured to be fastened to the carrier lens 102 by way of a suitable adhesive, such as epoxy. In an alternative embodiment, however, the rear cylindrical portion 309 may be provided with threads to engage similar threads in the carrier lens. The forward engagement portion 307 of the eyepiece housing 110 is further configured to receive a prism assembly 316 (FIGS. 29A, 29B). The prism assembly 316 includes a prism holder 317 including a pair of arms 319a, 319b, a base portion 321, and is adapted to fit within the housing 110. The forward portions of the arms 319a, 319b include circular cutout portions 323a, 323b respectively, to engage a holder ring 402. The holder ring 402 is configured, when attached in place (such as by an adhesive), to secure the prism elements 402, 406, 408. According to one embodiment, the prism elements (FIGS. 30–32) form a roof-pechan prism separated by a spacer 408. The spacer 408 is formed, for example, of a blackened ridge metal with a six millimeter diameter hole centered on the optical axis. The prism surfaces on opposite sides of the spacer are generally parallel. The individual elements of the roof pechan prism 406, 408 are illustrated in FIGS. 35–37 and 38–40, respectively. The prism elements are formed from Schott BAK4 or LAKIO glass.

Figures 20, 21:
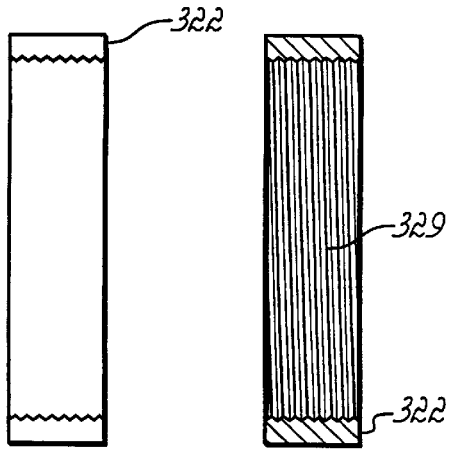
FIG. 20 is side elevational view of a spacer for the magnification loupes of FIGS. 1 and 2.
FIG. 21 is a side cross-sectional view of the spacer of FIG. 20.
Figure 22:
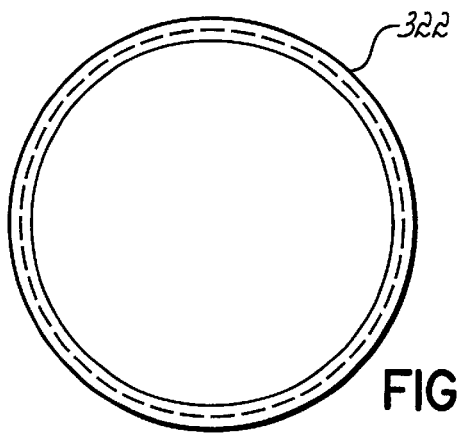
FIG. 22 is a top elevational view of the spacer of FIGS. 20 and 21.
Figure 23:
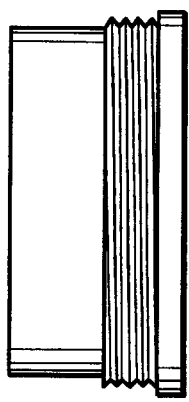
FIG. 23 is a side elevational view of a field stop of the magnification viewer.
Figure 24:
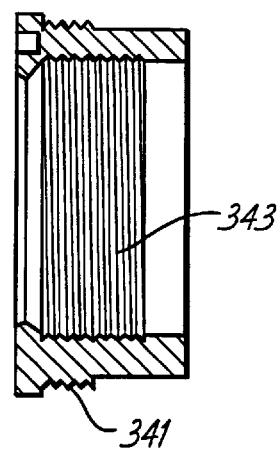
FIG. 24 is a side cross-sectional view of the spacer of FIG. 23.
Figure 25:
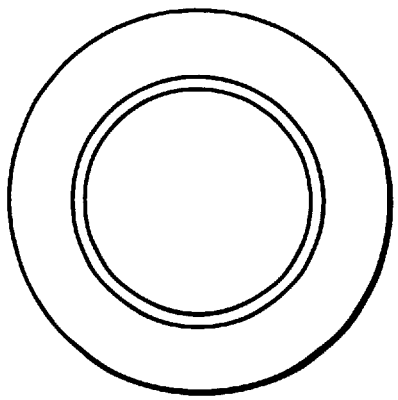
FIG. 25 is a top plan view of the spacer of FIGS. 23 and 24.
Figure 26:
FIG. 26 is a side elevational view of an objective lens retainer ring of the magnification loupes.

Turning back to FIGS. 13A–13B, the base of the prism assembly 316 is configured to rest against a rear wall 331 of the forward engagement portion 307 at approximately the position where it engages the rear cylindrical portion 309. A field stop 318 (FIGS. 23–25) having external threads 341 engages the corresponding internal threads 340 of the housing 110. The field stop 318 further includes internal grooves 343. The rear cylindrical portion 309 of the housing 110 further houses the eyepiece lens elements. As shown, the eyepiece lens includes elements 320 and 324, separated by a spacer 322. The spacer 322 is illustrated in FIGS. 20–22 and may include internal concentric grooves 329 which form a light baffle. Finally, the eyepiece lens 324 rests against the platform 344.

The exterior of the engagement housing 307 includes a pair of concentric circumferential grooves 325, 327 configured to receive the o-rings 326, 328 respectively. The o-rings 326, 328 additionally function to self-center the objective housing 108a and hence, the objective lens 312 relative to the eyepiece housing 110a. While the configuration described and shown with regard to FIGS. 13A–13B relates to a through-the-lens viewer, a similar configuration may be used in the outside-the-lens system shown in FIG. 2. Such a system may be used without a prescription lens and, 10 as will be described in greater detail below, a different eyepiece system.

Optical Characteristics

Figure 38:
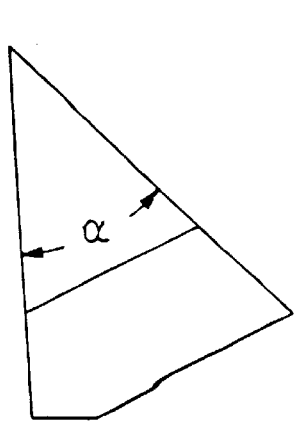
Figure 39:
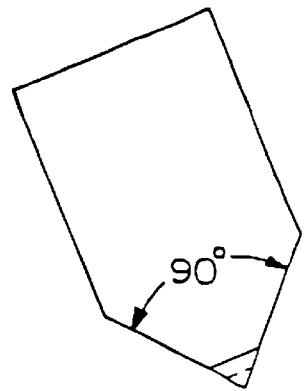
Figure 40:
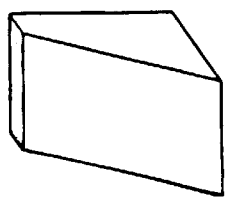
FIGS. 40–42 illustrate the second prism of the prism assembly of FIG. 29.
Figure 42:
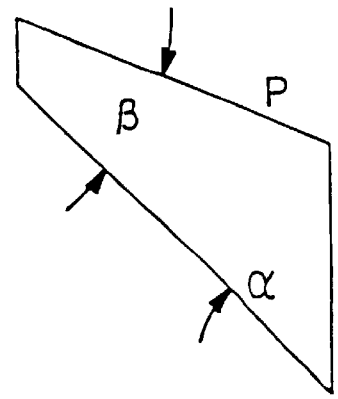
Figure 43:
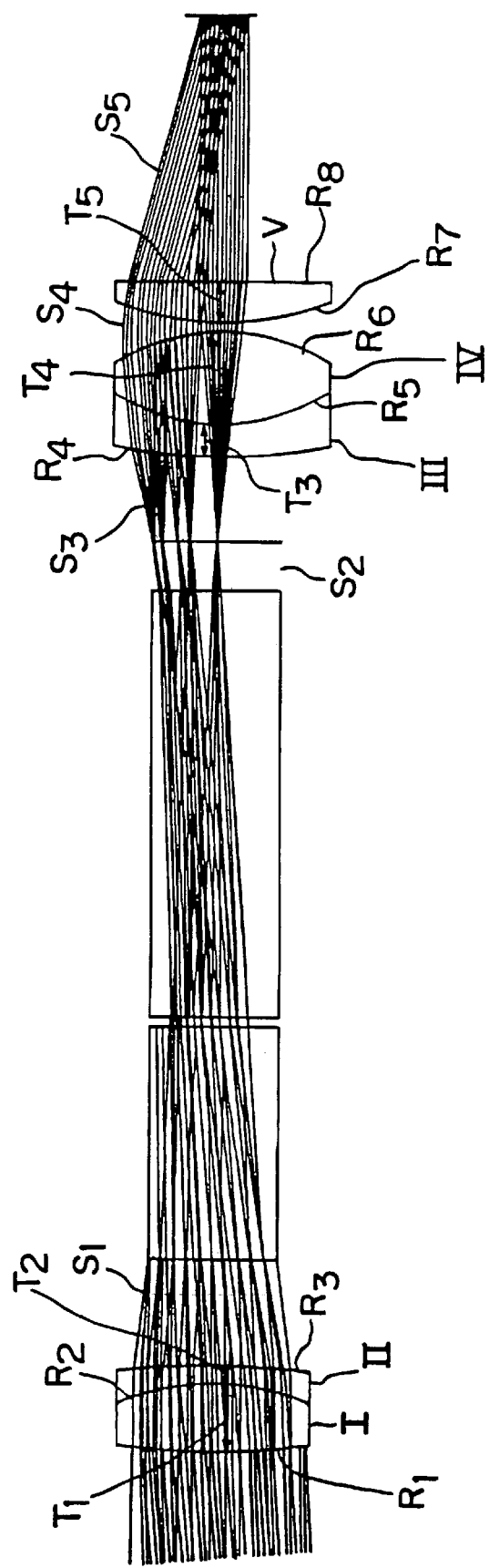
FIG. 43 is a diagram of the optical layout of the magnification loupe of FIG. 41.

Turning now to FIG. 43, a diagram illustrating the optical layout of the magnification loupe 106a, 106b is shown. The magnification loupe 106a, 106b as illustrated in FIG. 42 includes a two-element objective lens including elements I–II and including a three-element eyepiece including elements III–V. R1, R2 etc., represent the radii of respective refractive surfaces; S1–S5 represent the thickness of the air spaces; and T1, T2, etc., represent the thicknesses of the lens elements. As discussed above, according to one embodiment of the invention, magnifications of 3.3×, 3.8×, 4.3× and 4.8×are provided. All magnifications use the same prism and eyepiece lens system. As shown in FIGS. 38 and 42, the prior angle a may be used in the range 45°–49°, preferably 48° to increase the optical performance of the device while the prism angle B (FIG. 42) may be selected to be 24°. Thus, a common eyepiece housing 110 and optical elements included therein may be used for all of the magnifications. As discussed above, only the objective lens needs to be changed in order to alter the magnification.

The user may create a depth of field by adjusting the focal distance of each eye differently depending on the operation being performed. For example, a heart surgeon may wish to view the entire depth of the heart at high magnification previously unattainable in conventional magnification systems where depth of field is limited. This can be accomplished by adjusting the focus of the left eye one-inch beyond the right. When both eyes are then opened, the heart can be viewed in its entirety. However, a dentist may only require the depth of the coronal portion of the tooth to be in focus and thus, would only separate the focus by a millimeter or two. Alternatively, both magnification loupes can be precisely focused at the same distance for procedures requiring the highest resolution. The following exemplary fields of view may be provided:

93 mm@3.3×@16"WD
82 mm@3.8×@16"WD
72 mm@4.3×@16"WD
65 mm@4.8×@16"WD

Exemplary construction data for a magnification loupe built according to the embodiment shown are given in Tables I–XII. The radii, thickness, and separation dimensions are given in millimeters. Roman numerals identify the lens elements in their respective order from the objective side to the eyepoint side; $n_d$ represents the refractive index of each element; $v_d$ is the abbe dispersion number; R1, R2, etc., represent the radii of the respective refractive surfaces in order from the objective side to the eyepoint side; T1, T2, etc., represent the thicknesses of the lens elements from the objective side to the eyepoint side; S1, S2 represent the thicknesses of air spaces respectively from the objective side to the eyepoint side measured along the optical centerline. Again, it is noted that the prism/objective distance 5, can differ by about 2.5 mm if BAK4 glass is used, rather than LAKIO, as in the tables.

Figure 41:
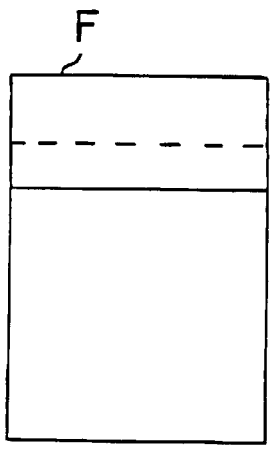
Figure 44:
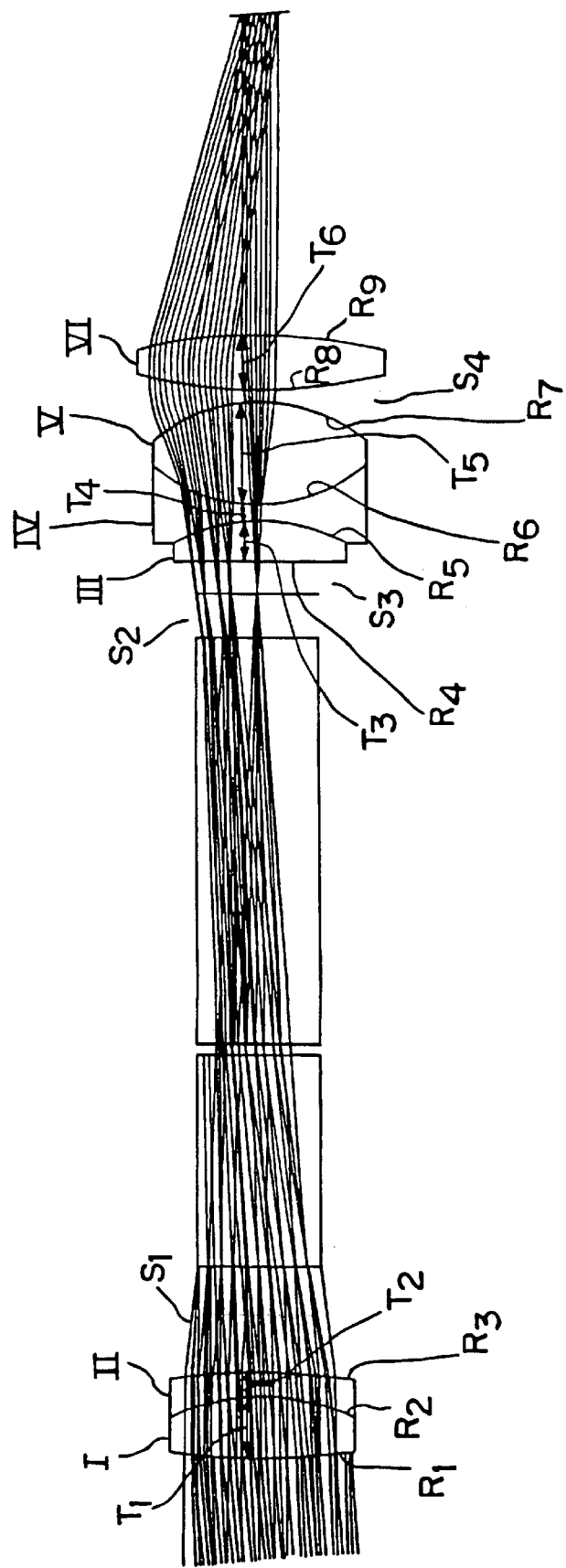
FIG. 44 is an optical layout diagram of the optical loupe of FIG. 41 according to an alternate embodiment.

FIG. 44 illustrates an embodiment of the present invention having long eye relief characteristics. Again, the system shown in FIG. 42 employs the same prism and eyepieces, but separate objective doublets for each level of magnification. The objective doublets and the prism, however, are the same as for the through-the-lens embodiment shown in FIG. 41. Additionally, only the eyepiece lens is changed from the through-the-lens configuration. As compared the embodiment of FIG. 1, eye relief—the distance to exit pupil—has been improved from about 17.8 mm to about 22.8 mm.

In particular, the viewer according to FIG. 42 includes the two-element or doublet objective including elements I–II and a four-element eyepiece lens including elements III–VI. R1, R2, etc., again represent the radii of respective refractive surfaces; 51 and 52 represent the thicknesses of the air spaces; and T1, T2, etc., represent the thicknesses of the lens elements.

Exemplary construction data for loupes according to the embodiment of FIG. 44 are given in Tables XIII–XXIV.

TABLE I

| | | | | 3.3X (12" WD) | | | |
|---|---|---|---|---|---|---|---|
| Element | Glass | $n_d$ | $v_d$ | Radius | Thickness | Diameter | Sep. |
| I | Ohara BAH 27 | 1.7015 | 41.2 | $R_1 = 42.19$ $R_2 = 12.45$ | 3.5 | 13.4 | |
| II | Ohara PBH6W | 1.8052 | 25.4 | $R_2 = 12.45$ $R_3 = 36.00$ | 1.5 | 13.4 | |
| Prism A | BAK4 LAK10 | 1.5688 1.7200 | 56.13 50.41 | | | | $S_1 = 6.96$ $S_2 = 3.41$ $S_3 = 7.04$ |
| Prism B | BAK4 LAK10 | 1.5688 1.7200 | 56.13 50.41 | | | | $S_4 = 0.05$ $S_5 = 17.86$ |
| III | Ohara PBH6W | 1.8052 | 25.4 | $R_3 = 44.00$ $R_4 = 13.00$ | 2.0 | 15.4 | |
| IV | Ohara FSL5 | 1.4875 | 70.2 | $R_5 = 13.00$ $R_6 = 13.00$ | 6.5 | 15.4 | |
| V | Ohara BAH10 | 1.6700 | 47.3 | $R_7 = 15.59$ $R_8 = 94.04$ | 3.0 | 15.4 | |

TABLE II 3.3X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 5.01<br>$S_2$ = 3.41<br>$S_3$ = 7.04 |
| Prism B | BAK4<br>LAK10 | 1.5688<br>1.7200 | 56.13<br>50.41 | | | | $S_4$ = 0.05<br>$S_5$ = 17.86 |
| III | Ohara PBH6W | 1.8052 | 25.4 | $R_3$ = 44.00<br>$R_4$ = 13.00 | 2.0 | 15.4 | |
| IV | Ohara FSL5 | 1.4875 | 70.2 | $R_5$ = 13.00<br>$R_6$ = 13.00 | 6.5 | 15.4 | |
| V | Ohara BAH10 | 1.6700 | 47.3 | $R_7$ = 15.59<br>$R_8$ = 94.04 | 3.0 | 15.4 | |

TABLE III 3.3X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 3.63<br>$S_2$ = 3.41<br>$S_3$ = 7.04 |
| Prism B | BAK4<br>LAK10 | 1.5688<br>1.7200 | 56.13<br>50.41 | | | | $S_4$ = 0.05<br>$S_5$ = 17.86 |
| III | Ohara PBH6W | 1.8052 | 25.4 | $R_3$ = 44.00<br>$R_4$ = 13.00 | 2.0 | 15.4 | |
| IV | Ohara FSL5 | 1.4875 | 70.2 | $R_5$ = 13.00<br>$R_6$ = 13.00 | 6.5 | 15.4 | |
| V | Ohara BAH10 | 1.6700 | 47.3 | $R_7$ = 15.59<br>$R_8$ = 94.04 | 3.0 | 15.4 | |

TABLE IV 3.8X
(12" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.04<br>$R_2$ = 14.61 | 4.0 | 13.4 | |
| II | Ohara PBH6W | 1.8052 | 25.4 | $R_2$ = 14.61<br>$R_3$ = 36.00 | 1.5 | 13.4 | |
| Prism A | BAK4<br>LAK10 | 1.5688<br>1.7200 | 56.13<br>50.41 | | | | $S_1$ = 12.38<br>$S_2$ = 3.41<br>$S_3$ = 7.04 |
| Prism B | BAK4<br>LAK10 | 1.5688<br>1.7200 | 56.13<br>50.41 | | | | $S_4$ = 0.05<br>$S_5$ = 17.86 |
| III | Ohara PBH6W | 1.8052 | 25.4 | $R_3$ = 44.00<br>$R_4$ = 13.00 | 2.0 | 15.4 | |
| IV | Ohara FSL5 | 1.4875 | 70.2 | $R_5$ = 13.00<br>$R_6$ = 13.00 | 6.5 | 15.4 | |
| V | Ohara BAH10 | 1.6700 | 47.3 | $R_7$ = 15.59<br>$R_8$ = 94.04 | 3.0 | 15.4 | |

TABLE V

3.8X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 42.04$<br>$R_2 = 14.61$ | 4.0 | 13.4 | |
| II | Ohara PBH6W | 1.8052 | 25.4 | $R_2 = 14.61$<br>$R_3 = 36.00$ | 1.5 | 13.4 | |
| Prism A | BAK4<br>LAK10 | 1.5688<br>1.7200 | 56.13<br>50.41 | | | | $S_1 = 9.92$<br>$S_2 = 3.41$<br>$S_3 = 7.04$ |
| Prism B | BAK4<br>LAK10 | 1.5688<br>1.7200 | 56.13<br>50.41 | | | | $S_4 = 0.05$<br>$S_5 = 17.86$ |
| III | Ohara PBH6W | 1.8052 | 25.4 | $R_3 = 44.00$<br>$R_4 = 13.00$ | 2.0 | 15.4 | |
| IV | Ohara FSL5 | 1.4875 | 70.2 | $R_5 = 13.00$<br>$R_6 = 13.00$ | 6.5 | 15.4 | |
| V | Ohara BAH10 | 1.6700 | 47.3 | $R_7 = 15.59$<br>$R_8 = 94.04$ | 3.0 | 15.4 | |

TABLE VI

3.8X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 42.04$<br>$R_2 = 14.61$ | 4.0 | 13.4 | |
| II | Ohara PBH6W | 1.8052 | 25.4 | $R_2 = 14.61$<br>$R_3 = 36.00$ | 1.5 | 13.4 | |
| Prism A | BAK4<br>LAK10 | 1.5688<br>1.7200 | 56.13<br>50.41 | | | | $S_1 = 8.02$<br>$S_2 = 3.41$<br>$S_3 = 7.04$ |
| Prism B | BAK4<br>LAK10 | 1.5688<br>1.7200 | 56.13<br>50.41 | | | | $S_4 = 0.05$<br>$S_5 = 17.86$ |
| III | Ohara PBH6W | 1.8052 | 25.4 | $R_3 = 44.00$<br>$R_4 = 13.00$ | 2.0 | 15.4 | |
| IV | Ohara FSL5 | 1.4875 | 70.2 | $R_5 = 13.00$<br>$R_6 = 13.00$ | 6.5 | 15.4 | |
| V | Ohara BAH10 | 1.6700 | 47.3 | $R_1 = 42.04$<br>$R_2 = 14.61$ | 3.0 | 15.4 | |

TABLE VII

4.3X
(12" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 50.15$<br>$R_2 = 16.00$ | 4.0 | 13.4 | |
| II | Ohara PBH6W | 1.8052 | 25.4 | $R_2 = 16.00$<br>$R_3 = 47.79$ | 1.5 | 13.4 | |
| Prism A | BAK4<br>LAK10 | 1.5688<br>1.7200 | 56.13<br>50.41 | | | | $S_1 = 18.07$<br>$S_2 = 3.41$<br>$S_3 = 7.04$ |
| Prism B | BAK4<br>LAK10 | 1.5688<br>1.7200 | 56.13<br>50.41 | | | | $S_4 = 0.05$<br>$S_5 = 17.86$ |
| III | Ohara PBH6W | 1.8052 | 25.4 | $R_3 = 44.00$<br>$R_4 = 13.00$ | 2.0 | 15.4 | |
| IV | Ohara FSL5 | 1.4875 | 70.2 | $R_5 = 13.00$<br>$R_6 = 13.00$ | 6.5 | 15.4 | |
| V | Ohara BAH10 | 1.6700 | 47.3 | $R_7 = 15.59$<br>$R_8 = 94.04$ | 3.0 | 15.4 | |

TABLE VIII

4.3X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 50.15<br>$R_2$ = 16.00 | 4.0 | 13.4 | |
| II | Ohara PBH6W | 1.8052 | 25.4 | $R_2$ = 16.00<br>$R_3$ = 47.79 | 1.5 | 13.4 | |
| Prism A | BAK4<br>LAK10 | 1.5688<br>1.7200 | 56.13<br>50.41 | | | | $S_1$ = 15.56<br>$S_2$ = 3.41<br>$S_3$ = 7.04 |
| Prism B | BAK4<br>LAK10 | 1.5688<br>1.7200 | 56.13<br>50.41 | | | | $S_4$ = 0.05<br>$S_5$ = 17.86 |
| III | Ohara PBH6W | 1.8052 | 25.4 | $R_3$ = 44.00<br>$R_4$ = 13.00 | 2.0 | 15.4 | |
| IV | Ohara FSL5 | 1.4875 | 70.2 | $R_5$ = 13.00<br>$R_6$ = 13.00 | 6.5 | 15.4 | |
| V | Ohara BAH10 | 1.6700 | 47.3 | $R_7$ = 15.59<br>$R_8$ = 94.04 | 3.0 | 15.4 | |

TABLE IX

4.3X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 50.15<br>$R_2$ = 16.00 | 4.0 | 13.4 | |
| II | Ohara PBH6W | 1.8052 | 25.4 | $R_2$ = 16.00<br>$R_3$ = 47.79 | 1.5 | 13.4 | |
| Prism A | BAK4<br>LAK10 | 1.5688<br>1.7200 | 56.13<br>50.41 | | | | $S_1$ = 13.13<br>$S_2$ = 3.41<br>$S_3$ = 7.04 |
| Prism B | BAK4<br>LAK10 | 1.5688<br>1.7200 | 56.13<br>50.41 | | | | $S_4$ = 0.05<br>$S_5$ = 17.86 |
| III | Ohara PBH6W | 1.8052 | 25.4 | $R_3$ = 44.00<br>$R_4$ = 13.00 | 2.0 | 15.4 | |
| IV | Ohara FSL5 | 1.4875 | 70.2 | $R_5$ = 13.00<br>$R_6$ = 13.00 | 6.5 | 15.4 | |
| V | Ohara BAH10 | 1.6700 | 47.3 | $R_7$ = 15.59<br>$R_8$ = 94.04 | 3.0 | 15.4 | |

TABLE X

4.8X
(12" WD)

| Element | Glass | $n_d$ | $v_d$ | Radius | Thickness | Diameter | Sep. |
|---|---|---|---|---|---|---|---|
| I | Ohara BAH 27 | | | 61.12 | 4.0 | 13.4 | |
| II | Ohara PBH6W | | | 16.98 | 1.5 | 13.4 | |
| Prism A | BAK4<br>LAK10 | 1.5688<br>1.7200 | 56.13<br>50.41 | | | | $S_1$ = 25.16<br>$S_2$ = 3.41<br>$S_3$ = 7.04 |
| Prism B | BAK4<br>LAK10 | 1.5688<br>1.7200 | 56.13<br>50.41 | | | | $S_4$ = 0.05<br>$S_5$ = 17.86 |
| III | Ohara PBH6W | 1.8052 | 25.4 | $R_3$ = 44.00<br>$R_4$ = 13.00 | 2.0 | 15.4 | |
| IV | Ohara FSL5 | 1.4875 | 70.2 | $R_5$ = 13.00<br>$R_6$ = 13.00 | 6.5 | 15.4 | |
| V | Ohara BAH10 | 1.6700 | 47.3 | $R_7$ = 15.59<br>$R_8$ = 94.04 | 3.0 | 15.4 | |

TABLE XI

4.8X (16" WD)

| Element | Glass | $n_d$ | $v_d$ | Radius | Thickness | Diameter | Sep. |
|---|---|---|---|---|---|---|---|
| I | Ohara BAH 27 | | | 61.12 | 4.0 | 13.4 | |
| II | Ohara PBH6W | | | 16.98 | 1.5 | 13.4 | |
| Prism A | BAK4 | 1.5688 | 56.13 | | | | $S_1 = 21.23$ |
| | LAK10 | 1.7200 | 50.41 | | | | $S_2 = 3.41$ |
| | | | | | | | $S_3 = 7.04$ |
| Prism B | BAK4 | 1.5688 | 56.13 | | | | $S_4 = 0.05$ |
| | LAK10 | 1.7200 | 50.41 | | | | $S_5 = 17.86$ |
| III | Ohara PBH6W | 1.8052 | 25.4 | $R_3 = 44.00$ $R_4 = 13.00$ | 2.0 | 15.4 | |
| IV | Ohara FSL5 | 1.4875 | 70.2 | $R_5 = 13.00$ $R_6 = 13.00$ | 6.5 | 15.4 | |
| V | Ohara BAH10 | 1.6700 | 47.3 | $R_7 = 15.59$ $R_8 = 94.04$ | 3.0 | 15.4 | |

TABLE XII

4.8X (24" WD)

| Element | Glass | $n_d$ | $v_d$ | Radius | Thickness | Diameter | Sep. |
|---|---|---|---|---|---|---|---|
| I | Ohara BAH 27 | | | 61.12 | 4.0 | 13.4 | |
| II | Ohara PBH6W | | | 16.98 | 1.5 | 13.4 | |
| Prism A | BAK4 | 1.5688 | 56.13 | | | | $S_1 = 18.22$ |
| | LAK10 | 1.7200 | 50.41 | | | | $S_2 = 3.41$ |
| | | | | | | | $S_3 = 7.04$ |
| Prism B | BAK4 | 1.5688 | 56.13 | | | | $S_4 = 0.05$ |
| | LAK10 | 1.7200 | 50.41 | | | | $S_5 = 17.86$ |
| III | Ohara PBH6W | 1.8052 | 25.4 | $R_3 = 44.00$ $R_4 = 13.00$ | 2.0 | 15.4 | |
| IV | Ohara FSL5 | 1.4875 | 70.2 | $R_5 = 13.00$ $R_6 = 13.00$ | 6.5 | 15.4 | |
| V | Ohara BAH10 | 1.6700 | 47.3 | $R_7 = 15.59$ $R_8 = 94.04$ | 3.0 | 15.4 | |

TABLE XIII

3.3X (12" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 42.19$ $R_2 = 12.45$ | 3.5 | 13.4 | |
| II | Ohara PBH6W | 1.8052 | 25.4 | $R_2 = 12.45$ $R_3 = 36.00$ | 1.5 | 13.4 | |
| Prism A | BAK4 | 1.5688 | 56.13 | | | | $S_1 = 6.96$ |
| | LAK10 | 1.7200 | 50.41 | | | | $S_2 = 3.41$ |
| | | | | | | | $S_3 = 7.04$ |
| Prism B | BAK4 | 1.5688 | 56.13 | | | | $S_4 = 0.5$ |
| | LAK10 | 1.7200 | 50.41 | | | | $S_5 = 22.8$ |
| III | Ohara S-TIL2 | 1.5410 | 47.2 | $R_3$ = PLANO $R_4 = 12.61$ | 3.0 | 12.0 | |
| IV | Ohara PBH71 | 1.923 | 21.3 | $R_5 = 12.61$ $R_6 = 12.61$ | 1.5 | 15.4 | |

TABLE XIII-continued 3.3X
(12" WD)

| Element | Glass | $n_d$ | $v_d$ | Radius | Thickness | Diameter | Sep. |
|---|---|---|---|---|---|---|---|
| V | Schott BK7 | 1.5168 | 64.2 | $R_7$ = 10.06<br>$R_8$ = 12.61 | 7.1 | 15.4 | |
| VI | Schott S-LAM2 | 1.744 | 44.8 | $R_8$ = 25.11<br>$R_9$ = 25.11 | 4.7 | 17.5 | |

TABLE XIV 3.3X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 5.10<br>$S_2$ = 3.41<br>$S_3$ = 2.33 |
| Prism B | BAK4<br>LAK10 | 1.5688<br>1.7200 | 56.13<br>50.41 | | | | $S_4$ = 0.5<br>$S_5$ = 22.8 |
| III | Ohara S-TIL2 | 1.5410 | 47.2 | $R_3$ = PLANO<br>$R_4$ = 12.61 | 3.0 | 12.0 | |
| IV | Ohara PBH71 | 1.923 | 21.3 | $R_5$ = 12.61<br>$R_6$ = 12.61 | 1.5 | 15.4 | |
| V | Schott BK7 | 1.5168 | 64.2 | $R_7$ = 10.06<br>$R_8$ = 12.61 | 7.1 | 15.4 | |
| VI | Schott S-LAM2 | 1.744 | 44.8 | $R_8$ = 25.11<br>$R_9$ = 25.11 | 4.7 | 17.5 | |

TABLE XV 3.3X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 3.63<br>$S_2$ = 3.41<br>$S_3$ = 2.33 |
| Prism B | BAK4<br>LAK10 | 1.5688<br>1.7200 | 56.13<br>50.41 | | | | $S_4$ = 0.5<br>$S_5$ = 22.8 |
| III | Ohara S-TIL2 | 1.5410 | 47.2 | $R_3$ = PLANO<br>$R_4$ = 12.61 | 3.0 | 12.0 | |
| IV | Ohara PBH71 | 1.923 | 21.3 | $R_5$ = 12.61<br>$R_6$ = 12.61 | 1.5 | 15.4 | |
| V | Schott BK7 | 1.5168 | 64.2 | $R_7$ = 10.06<br>$R_8$ = 12.61 | 7.1 | 15.4 | |
| VI | Schott S-LAM2 | 1.744 | 44.8 | $R_8$ = 25.11<br>$R_9$ = 25.11 | 4.7 | 17.5 | |

TABLE XVI 3.8X
(12" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19 $R_2$ = 12.45 | 3.5 | 13.4 | |
| II | Ohara PBH6W | 1.8052 | 25.4 | $R_2$ = 12.45 $R_3$ = 36.00 | 1.5 | 13.4 | |
| Prism A | BAK4 | 1.5688 | 56.13 | | | | $S_1$ = 12.38 |
| | LAK10 | 1.7200 | 50.41 | | | | $S_2$ = 3.41 |
| | | | | | | | $S_3$ = 2.33 |
| Prism B | BAK4 | 1.5688 | 56.13 | | | | $S_4$ = 0.5 |
| | LAK10 | 1.7200 | 50.41 | | | | $S_5$ = 22.8 |
| III | Ohara S-TIL2 | 1.5410 | 47.2 | $R_3$ = PLANO $R_4$ = 12.61 | 3.0 | 12.0 | |
| IV | Ohara PBH71 | 1.923 | 21.3 | $R_5$ = 12.61 $R_6$ = 12.61 | 1.5 | 15.4 | |
| V | Schott BK7 | 1.5168 | 64.2 | $R_7$ = 10.06 $R_8$ = 12.61 | 7.1 | 15.4 | |
| VI | Schott S-LAM2 | 1.744 | 44.8 | $R_8$ = 25.11 $R_9$ = 25.11 | 4.7 | 17.5 | |

TABLE XVII 3.8X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19 $R_2$ = 12.45 | 3.5 | 13.4 | |
| II | Ohara PBH6W | 1.8052 | 25.4 | $R_2$ = 12.45 $R_3$ = 36.00 | 1.5 | 13.4 | |
| Prism A | BAK4 | 1.5688 | 56.13 | | | | $S_1$ = 9.92 |
| | LAK10 | 1.7200 | 50.41 | | | | $S_2$ = 3.41 |
| | | | | | | | $S_3$ = 2.33 |
| Prism B | BAK4 | 1.5688 | 56.13 | | | | $S_4$ = 0.5 |
| | LAK10 | 1.7200 | 50.41 | | | | $S_5$ = 22.8 |
| III | Ohara S-TIL2 | 1.5410 | 47.2 | $R_3$ = PLANO $R_4$ = 12.61 | 3.0 | 12.0 | |
| IV | Ohara PBH71 | 1.923 | 21.3 | $R_5$ = 12.61 $R_6$ = 12.61 | 1.5 | 15.4 | |
| V | Schott BK7 | 1.5168 | 64.2 | $R_7$ = 10.06 $R_8$ = 12.61 | 7.1 | 15.4 | |
| VI | Schott S-LAM2 | 1.744 | 44.8 | $R_8$ = 25.11 $R_9$ = 25.11 | 4.7 | 17.5 | |

TABLE XVIII 3.8X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19 $R_2$ = 12.45 | 3.5 | 13.4 | |
| II | Ohara PBH6W | 1.8052 | 25.4 | $R_2$ = 12.45 $R_3$ = 36.00 | 1.5 | 13.4 | |
| Prism A | BAK4 | 1.5688 | 56.13 | | | | $S_1$ = 8.02 |
| | LAK10 | 1.7200 | 50.41 | | | | $S_2$ = 3.41 |
| | | | | | | | $S_3$ = 2.33 |
| Prism B | BAK4 | 1.5688 | 56.13 | | | | $S_4$ = 0.5 |
| | LAK10 | 1.7200 | 50.41 | | | | $S_5$ = 22.8 |
| III | Ohara S-TIL2 | 1.5410 | 47.2 | $R_3$ = PLANO $R_4$ = 12.61 | 3.0 | 12.0 | |
| IV | Ohara PBH71 | 1.923 | 21.3 | $R_5$ = 12.61 $R_6$ = 12.61 | 1.5 | 15.4 | |

TABLE XVIII-continued

3.8X
(24" WD)

| Element | Glass | $n_d$ | $v_d$ | Radius | Thickness | Diameter | Sep. |
|---|---|---|---|---|---|---|---|
| V | Schott BK7 | 1.5168 | 64.2 | $R_7 = 10.06$<br>$R_8 = 12.61$ | 7.1 | 15.4 | |
| VI | Schott S-LAM2 | 1.744 | 44.8 | $R_8 = 25.11$<br>$R_9 = 25.11$ | 4.7 | 17.5 | |

TABLE XIX

4.3X
(12" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 42.19$<br>$R_2 = 12.45$ | 3.5 | 13.4 | |
| II | Ohara PBH6W | 1.8052 | 25.4 | $R_2 = 12.45$<br>$R_3 = 36.00$ | 1.5 | 13.4 | |
| Prism A | BAK4<br>LAK10 | 1.5688<br>1.7200 | 56.13<br>50.41 | | | | $S_1 = 18.7$<br>$S_2 = 3.41$<br>$S_3 = 2.33$ |
| Prism B | BAK4<br>LAK10 | 1.5688<br>1.7200 | 56.13<br>50.41 | | | | $S_4 = 0.5$<br>$S_5 = 22.8$ |
| III | Ohara S-TIL2 | 1.5410 | 47.2 | $R_3 = $ PLANO<br>$R_4 = 12.61$ | 3.0 | 12.0 | |
| IV | Ohara PBH71 | 1.923 | 21.3 | $R_5 = 12.61$<br>$R_6 = 12.61$ | 1.5 | 15.4 | |
| V | Schott BK7 | 1.5168 | 64.2 | $R_7 = 10.06$<br>$R_8 = 12.61$ | 7.1 | 15.4 | |
| VI | Schott S-LAM2 | 1.744 | 44.8 | $R_8 = 25.11$<br>$R_9 = 25.11$ | 4.7 | 17.5 | |

TABLE XX

4.3X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 42.19$<br>$R_2 = 12.45$ | 3.5 | 13.4 | |
| II | Ohara PBH6W | 1.8052 | 25.4 | $R_2 = 12.45$<br>$R_3 = 36.00$ | 1.5 | 13.4 | |
| Prism A | BAK4<br>LAK10 | 1.5688<br>1.7200 | 56.13<br>50.41 | | | | $S_1 = 15.56$<br>$S_2 = 3.41$<br>$S_3 = 2.33$ |
| Prism B | BAK4<br>LAK10 | 1.5688<br>1.7200 | 56.13<br>50.41 | | | | $S_4 = 0.5$<br>$S_5 = 22.8$ |
| III | Ohara S-TIL2 | 1.5410 | 47.2 | $R_3 = $ PLANO<br>$R_4 = 12.61$ | 3.0 | 12.0 | |
| IV | Ohara PBH71 | 1.923 | 21.3 | $R_5 = 12.61$<br>$R_6 = 12.61$ | 1.5 | 15.4 | |
| V | Schott BK7 | 1.5168 | 64.2 | $R_7 = 10.06$<br>$R_8 = 12.61$ | 7.1 | 15.4 | |
| VI | Schott S-LAM2 | 1.744 | 44.8 | $R_8 = 25.11$<br>$R_9 = 25.11$ | 4.7 | 17.5 | |

TABLE XXI

4.3X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 13.13<br>$S_2$ = 3.41<br>$S_3$ = 2.33 |
| Prism B | BAK4<br>LAK10 | 1.5688<br>1.7200 | 56.13<br>50.41 | | | | $S_4$ = 0.5<br>$S_5$ = 22.8 |
| III | Ohara S-TIL2 | 1.5410 | 47.2 | $R_3$ = PLANO<br>$R_4$ = 12.61 | 3.0 | 12.0 | |
| IV | Ohara PBH71 | 1.923 | 21.3 | $R_5$ = 12.61<br>$R_6$ = 12.61 | 1.5 | 15.4 | |
| V | Schott BK7 | 1.5168 | 64.2 | $R_7$ = 10.06<br>$R_8$ = 12.61 | 7.1 | 15.4 | |
| VI | Schott S-LAM2 | 1.744 | 44.8 | $R_8$ = 25.11<br>$R_9$ = 25.11 | 4.7 | 17.5 | |

TABLE XXII

4.8X
(12" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 25.16<br>$S_2$ = 3.41<br>$S_3$ = 2.33 |
| Prism B | BAK4<br>LAK10 | 1.5688<br>1.7200 | 56.13<br>50.41 | | | | $S_4$ = 0.5<br>$S_5$ = 22.8 |
| III | Ohara S-TIL2 | 1.5410 | 47.2 | $R_3$ = PLANO<br>$R_4$ = 12.61 | 3.0 | 12.0 | |
| IV | Ohara PBH71 | 1.923 | 21.3 | $R_5$ = 12.61<br>$R_6$ = 12.61 | 1.5 | 15.4 | |
| V | Schott BK7 | 1.5168 | 64.2 | $R_7$ = 10.06<br>$R_8$ = 12.61 | 7.1 | 15.4 | |
| VI | Schott S-LAM2 | 1.744 | 44.8 | $R_8$ = 25.11<br>$R_9$ = 25.11 | 4.7 | 17.5 | |

TABLE XXIII

4.8X
(16" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1$ = 42.19<br>$R_2$ = 12.45 | 3.5 | 13.4 | |
| II | Ohara PBH6W | 1.8052 | 25.4 | $R_2$ = 12.45<br>$R_3$ = 36.00 | 1.5 | 13.4 | |
| Prism A | BAK4<br>LAK10 | 1.5688<br>1.7200 | 56.13<br>50.41 | | | | $S_1$ = 21.23<br>$S_2$ = 3.41<br>$S_3$ = 2.33 |
| Prism B | BAK4<br>LAK10 | 1.5688<br>1.7200 | 56.13<br>50.41 | | | | $S_4$ = 0.5<br>$S_5$ = 22.8 |
| III | Ohara S-TIL2 | 1.5410 | 47.2 | $R_3$ = PLANO<br>$R_4$ = 12.61 | 3.0 | 12.0 | |
| IV | Ohara PBH71 | 1.923 | 21.3 | $R_5$ = 12.61<br>$R_6$ = 12.61 | 1.5 | 15.4 | |

TABLE XXIII-continued 4.8X
(16" WD)

| Element | Glass | $n_d$ | $v_d$ | Radius | Thickness | Diameter | Sep. |
|---|---|---|---|---|---|---|---|
| V | Schott BK7 | 1.5168 | 64.2 | $R_7 = 10.06$<br>$R_8 = 12.61$ | 7.1 | 15.4 | |
| VI | Schott S-LAM2 | 1.744 | 44.8 | $R_8 = 25.11$<br>$R_9 = 25.11$ | 4.7 | 17.5 | |

TABLE XXIV 4.8X
(24" WD)

| Element | Glass | $n_d$ | $v_d$ | Radius | Thickness | Diameter | Sep. |
|---|---|---|---|---|---|---|---|
| I | Ohara BAH 27 | 1.7015 | 41.2 | $R_1 = 42.19$<br>$R_2 = 12.45$ | 3.5 | 13.4 | |
| II | Ohara PBH6W | 1.8052 | 25.4 | $R_2 = 12.45$<br>$R_3 = 36.00$ | 1.5 | 13.4 | |
| Prism A | BAK4<br>LAK10 | 1.5688<br>1.7200 | 56.13<br>50.41 | | | | $S_1 = 18.22$<br>$S_2 = 3.41$<br>$S_3 = 2.33$ |
| Prism B | BAK4<br>LAK10 | 1.5688<br>1.7200 | 56.13<br>50.41 | | | | $S_4 = 0.5$<br>$S_5 = 22.8$ |
| III | Ohara S-TIL2 | 1.5410 | 47.2 | $R_3 = $ PLANO<br>$R_4 = 12.61$ | 3.0 | 12.0 | |
| IV | Ohara PBH71 | 1.923 | 21.3 | $R_5 = 12.61$<br>$R_6 = 12.61$ | 1.5 | 15.4 | |
| V | Schott BK7 | 1.5168 | 64.2 | $R_7 = 10.06$<br>$R_8 = 12.61$ | 7.1 | 15.4 | |
| VI | Schott S-LAM2 | 1.744 | 44.8 | $R_8 = 25.11$<br>$R_9 = 25.11$ | 4.7 | 17.5 | |

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An apparatus for mounting optical loupes to spectacles having a pair of lenses joined by a bridge, said apparatus comprising:

a bridge mount configured to be attached to the spectacles proximate the bridge of the spectacles;

an elongate support member extending along a direction substantially normal to the bridge of the spectacles and pivotally coupled to said bridge mount for pivotal movement about a first axis substantially parallel to the bridge, wherein said support member positionable in any orientation about said first axis, forward of the lenses of the spectacles;

a saddle slidably received on said support member and movable along a longitudinal direction of said support member;

a pair of elongate mount bar extensions slidably coupled to said saddle and extending in opposite directions along a second axis substantially transverse to said longitudinal direction of said support member, said mount bar extensions movable along said second axis to thereby vary an interpupillary distance of the optical loupes; and a pair of loupe support members pivotally coupled to respective distal ends of said mount bar extensions for rotational movement about respective third and fourth axes substantially perpendicular to said second axis to thereby permit adjustment of a convergence angle of the optical loupes.

2. The apparatus of claim 1, wherein said mount bar extensions are coupled to said saddle for rotational movement about said second axis to thereby permit adjustment of a declination angle of the optical loupes.

3. The apparatus of claim 1, further comprising a light mount adapter coupled to said saddle and configured to receive a light for illuminating at least a portion of a viewing area of the optical loupes.

4. The apparatus of claim 3, wherein said light mount adapter is configured to permit pivotal movement of the light about an axis substantially parallel to said first axis.

5. The apparatus of claim 1, further comprising a grip removably received on said support member proximate a distal end of said support member opposite said bridge mount.

6. An magnification viewer for use with a pair of spectacles having a pair of lenses joined by a bridge, the magnification viewer comprising:

an optical loupe mounting apparatus, including:

a bridge mount configured to be attached to the spectacles proximate the bridge of the spectacles;

an elongate support member extending along a direction substantially normal to the bridge of the spectacles and pivotally coupled to said bridge mount for pivotal movement about a first axis substantially parallel to the bridge, whereby said support member may-be positioned in any orientation about said first axis, forward of the lenses of the spectacles;

a saddle slidably received on said support member and movable along a longitudinal direction of said support member;

a pair of elongate mount bar extensions slidably coupled to said saddle and extending in opposite directions along a second axis substantially transverse to said longitudinal direction of said support member, said mount bar extensions movable along said second axis to thereby vary an interpupillary distance of the optical loupes; and a pair of loupe support members pivotally coupled to respective distal ends of said mount bar extensions for rotational movement about respective third and fourth axes substantially perpendicular to said second axis to thereby permit adjustment of a convergence angle of the optical loupes; and a pair of optical loupes coupled to said mounting apparatus proximate said loupe support members.

7. A viewer system comprising:

a pair of spectacles including a pair of lenses joined by a bridge extending therebetween;

an optical loupe mounting apparatus, including:

a bridge mount configured to be attached to the spectacles proximate said bridge, an elongate support member extending along a direction substantially normal to the bridge and pivotally coupled to said bridge mount for pivotal movement about a first axis substantially parallel to the bridge, whereby said support member may be positioned, in any orientation about said first axis, forward of the lenses of said lenses, a saddle slidably received on said support member and movable along a longitudinal direction of said support member, a pair of elongate mount bar extensions slidably coupled to said saddle and extending in opposite directions along a second axis substantially transverse to said longitudinal direction of said support member, said mount bar extensions movable along said second axis to thereby vary an interpupillary distance of the optical loupes associated with the viewer, and a pair of loupe support members pivotally coupled to respective distal ends of said mount bar extensions for rotational movement about respective third and fourth axes substantially perpendicular to said second axis to thereby permit adjustment of a convergence angle of the optical loupes associated with the viewer; and a pair of optical loupes coupled to said mounting apparatus proximate said loupe support members.

\* \* \* \* \*

UNITED STATES PATENT AND TRADEMARK OFFICE
CERTIFICATE OF CORRECTION

PATENT NO. : 6,667,832 B2  Page 1 of 4
DATED : December 23, 2003
INVENTOR(S) : Charles H. Caplan et al.

Figure 9:
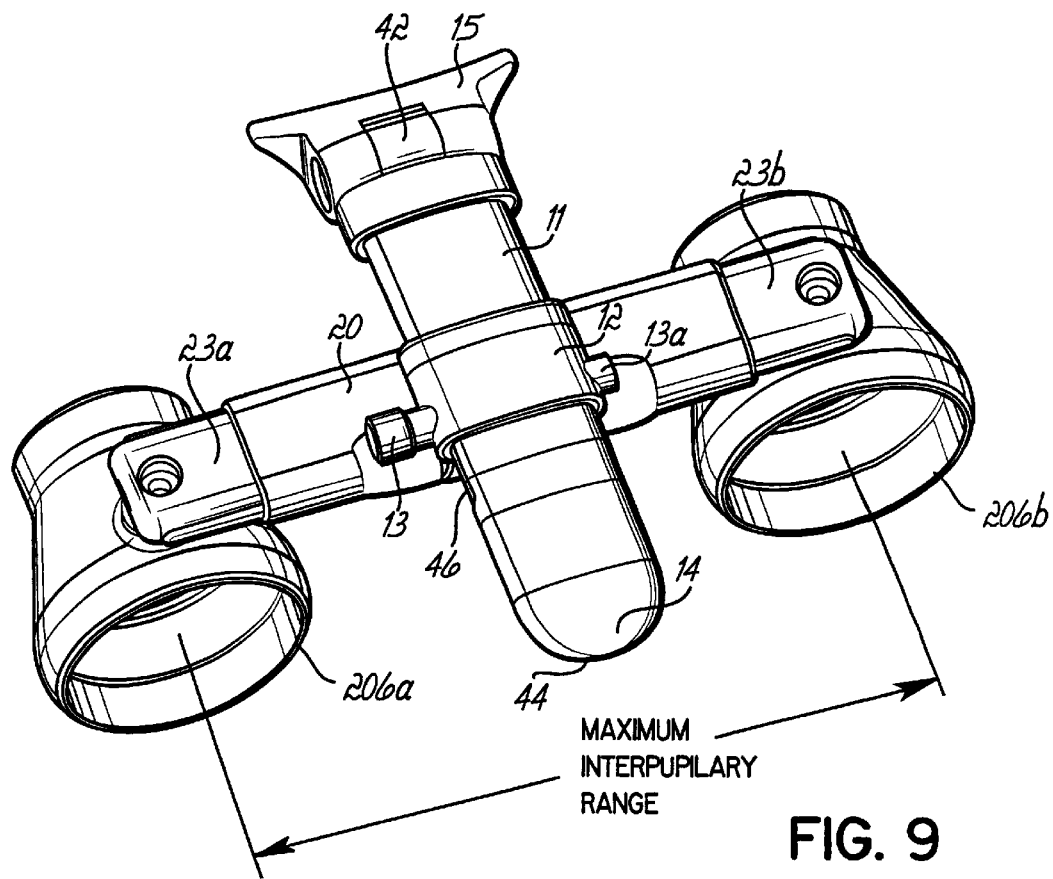
FIG. 9 is a top view of an embodiment of the present invention showing the maximum interpupillary range.
Figure 10:
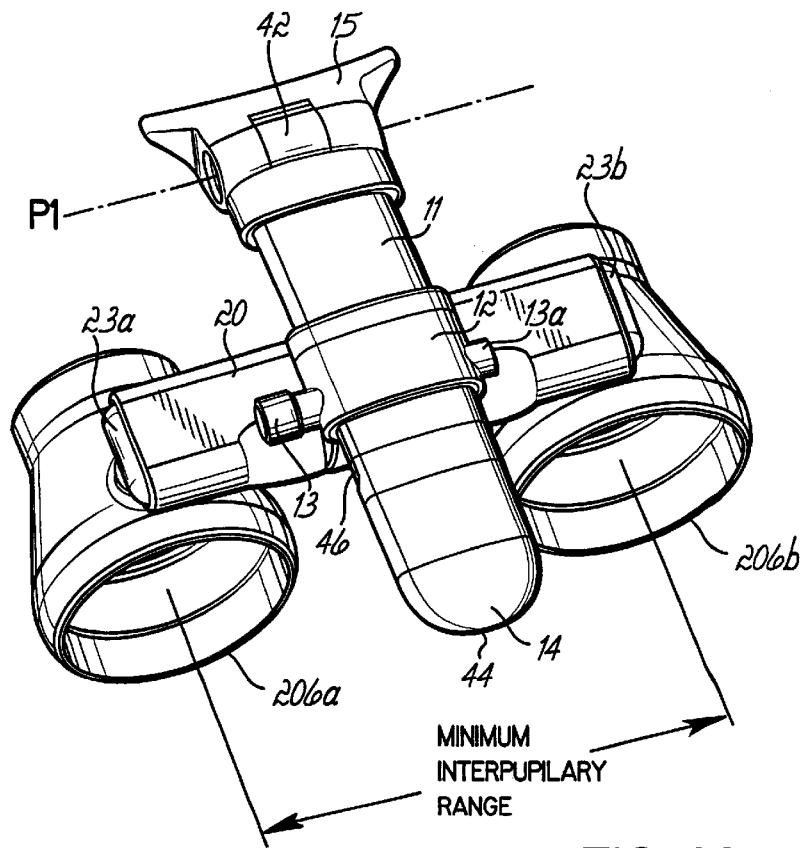
FIG. 10 is a top view of an embodiment of the present invention showing the minimum interpupillary range.
Figure 11:
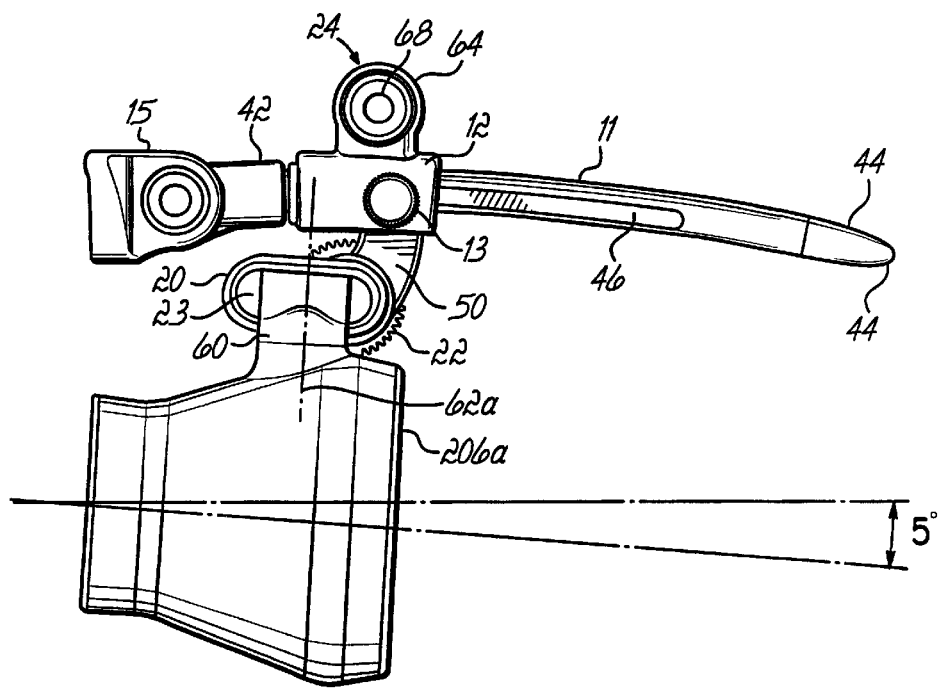
FIG. 11 is a side view of an embodiment of the present invention showing the minimum declination angle.

It is certified that error appears in the above-identified patent and that said Letters Patent is hereby corrected as shown below:

Drawings,
FIG. 9, reads "INTERPUPILARY" and should read -- INTERPUPILLARY --.
FIG. 10, reads "INTERPUPILARY" and should read -- INTERPUPILLARY --.

Column 1,
Lines 26-28, "It is well known that the nature of these tasks and the physical demands they place on the neck and or the entire optical loupes." and should read -- It is well known that the nature of these tasks and the physical demands they place on the neck and shoulders create stress, pain and degrade performance of the individual. Altering the angle of the head to approximate a resting posture during these tasks can alleviate much discomfort and greatly improve performance, morale and productivity. The eyes, however, still need to focus on the task and raising the head to the resting posture pulls the eyes up and away from the task. If the head is at a resting posture and the person does not have a magnification apparatus, the person will squint and place strain on the eyes in order to see the task being performed. Thus, a need exists for an apparatus which will allow the eyes to focus on the task being performed and will also magnify the task being performed such that little strain is placed on the eyes. A further need exists which will allow the person to see the task being performed but will also allow the head to remain at a resting posture.
    Magnification viewers, including the general category of magnification loupes, are worn by persons performing the tasks described above. The viewers permit the persons to operate at a greater working distance from the patient. Higher magnification viewers also reduce the persons' exposure to aerosols and other chemicals which are easily vaporized. Because these magnification viewers are used during procedures requiring manual precision, it is important that the viewers are lightweight, comfortable and allow the user clarity and a wide field of vision while providing high magnification and ease of adjustment.
    Magnification viewers can be attached to a spectacle frame in one of two ways, either the viewers are built into the spectacles or the viewers are attached to the bridge of the spectacles. Most magnification viewers do not allow adjustment of the magnification level, the inclination or declination of the viewers as respects the spectacles, or the working distance between the user and the task being performed without a tedious process of replacing either the individual lens elements or the entire optical loupes. --.

Column 2,
Line 48, reads "...adjustable nose price for..." and should read -- ...adjustable nose piece for --.
Line 62, reads "FIG. 6 is perspective view of an embodiment..." and should read -- FIG. 6 is a perspective view of an embodiment --.

Column 3,
Line 5, reads "FIG. 9 is a top view of an embodiment of the present invention showing the maximum 10 interpupillary range." and should read -- FIG. 9 is a top view of an embodiment of the present invention showing the maximum interpupillary range. --.
Line 35, reads "FIG. 20 is side elevational view of..." and should read -- FIG. 20 is a side elevational view of --.

UNITED STATES PATENT AND TRADEMARK OFFICE
CERTIFICATE OF CORRECTION

PATENT NO.     : 6,667,832 B2
DATED          : December 23, 2003
INVENTOR(S)    : Charles H. Caplan et al.

Figure 27:
FIG. 27 is side cross-sectional view of the objective retainer of FIG. 26.
Figure 28:
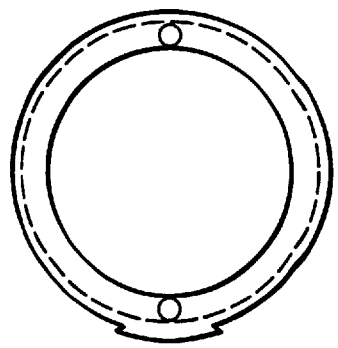
FIG. 28 is a top plan view of the objective retainer of FIGS. 26 and 27.

It is certified that error appears in the above-identified patent and that said Letters Patent is hereby corrected as shown below:

Column 3 (cont'd),
Line 50, reads "FIG. 27 is side cross-sectional view of..." and should read -- FIG. 27 is a side cross-sectional view of --.

Column 4,
Line 4, reads "The description which follows described a..." and should read -- The description which follows describes a --.
Line 25, reads "...for adjusting a pair of extension of arm 254, 256 to enable..." and should read -- ...for adjusting a pair of extension arms 254, 256 to enable... --.
Line 41, reads "...defining a first pivot access P1 for..." and should read -- ...defining a first pivot axis P1 for... --.
Line 45, reads "...along first pivot access P1 and..." and should read -- ...along first pivot axis P1 and... --.

Column 5,
Line 9, reads "...second pivot access P2 parallel..." and should read -- ....second pivot axis P2 parallel... --.
Line 10, reads "...pivot access P1. An elongate..." and should read -- ...pivot axis -P1. An elongate... --.
Line 18, reads "...along second pivot access P2 and through..." and should read -- ...along second pivot axis P2 and through... --.
Line 27, reads "...to second pivot access P2 and thereby simultaneously..." and should read -- ...to second pivot axis P2 and thereby simultaneously... --.
Lines 61-62, reads "...parallel second pivot access P2." and should read -- ...parallel second pivot axis P2. --.

Column 6,
Lines 63-64, reads "The combination of two axis of rotation P1, P2, one at the..." and should read -- The combination of two axes of rotation P1, P2, one at the... --.
Line 65, reads "...hinge tab saddle produce a compound declination angle..." and should read -- ...hinge tab saddle produces a compound declination angle... --.

Column 7,
Lines 22-23, reads "...in accordance with the present invention are shown." and should read -- ...in accordance with the present invention is shown. --.
Line 38, reads "...so that the pin 302 engage the spirals or threads 306..." and should read -- ...so that the pin 302 engages the spirals or threads 306... --.
Line 40, reads "...between the two housing 106a and 108a..." and should read -- ...between the two housings 106a and 108a... --.
Line 48, reads "Another important aspect of the invention, is that..." and should read -- Another important aspect of the invention is that... --.

UNITED STATES PATENT AND TRADEMARK OFFICE
CERTIFICATE OF CORRECTION

PATENT NO. : 6,667,832 B2
DATED : December 23, 2003
INVENTOR(S) : Charles H. Caplan et al.

It is certified that error appears in the above-identified patent and that said Letters Patent is hereby corrected as shown below:

Column 7 (cont'd),
Lines 57-58, reads "...in the loupe 106a, 106b." and should read -- ...in the loupes 106a, 106b. --.
Line 63, reads "...of the loupe 106a, 106b." and should read -- ...of the loupes 106a, 106b. --.

Column 8,
Lines 52-53, reads "...formed from Schott BAK4 or LAKIO glass." and should read -- ...formed from Schott BAK4 or LAK10 glass. --.

Column 9,
Line 10, reads "...without a prescription lens and, 10 as will be described in greater detail..." and should read -- ...without a prescription lens and, as will be described in greater detail... --.
Line 16, reads "...layout of the magnification loupe 106a, 106b is shown..." and should read -- ...layout of the magnification loupes 106a, 106b is shown... --.
Line 17, reads "...magnification loupe 106a, 106b as illustrated in FIG. 42..." and should read -- ...magnification loupes 106a, 106b as illustrated in FIG. 42... --.
Line 26, reads "...and 4.8xare provided. All magnifications..." and should read -- ...and 4.8x are provided. All magnifications... --.

Column 10,
Lines 25-26, reads "...rather than LAKIO, as in the tables..." and should read -- ...rather than LAK10, as in the tables... --.
Line 34 reads "As compared the embodiment..." and should read -- As compared to the embodiment... --.

Column 27,
Lines 48-49, reads "...spirit of Applicant's general inventive concept." and should read -- ...spirit of Applicants' general inventive concept. --.
Line 60, claim 1 reads "...wherein said support member positionable..." and should read -- ...wherein said support member is positionable... --.

Column 28,
Line 62, reads "An magnification viewer for use..." and should read -- A magnification viewer for use... --.

Column 29,
Lines 5-6, reads "...whereby said support member may-be positioned in any..." and should read -- ...wherein said support member is positionable in any... --.

UNITED STATES PATENT AND TRADEMARK OFFICE
CERTIFICATE OF CORRECTION

PATENT NO. : 6,667,832 B2
DATED : December 23, 2003
INVENTOR(S) : Charles H. Caplan et al.

It is certified that error appears in the above-identified patent and that said Letters Patent is hereby corrected as shown below:

Column 30,
Line 6, reads "...whereby said support member may be positioned, in any..." and should read -- ...wherein said support member is positionable, in any... --.
Lines 7-8, claim 7 reads "...forward of the lenses of said lenses,..." and should read -- ...forward of the lenses of said spectacles,... --.

Signed and Sealed this

Eighth Day of February, 2005

JON W. DUDAS
*Director of the United States Patent and Trademark Office*